United States Patent

Schottek et al.

(10) Patent No.: US 6,458,982 B1
(45) Date of Patent: Oct. 1, 2002

(54) TRANSITION METAL COMPOUND, CATALYST, ITS PRODUCTION AND ITS USE FOR THE POLYMERIZATION OF OLEFINS

(75) Inventors: Jörg Schottek, Frankfurt; Roland Kratzer, Kriftel, both of (DE)

(73) Assignee: Targor GmbH, Mainz (DE)

( * ) Notice: Subject to any disclaimer, the term of this patent is extended or adjusted under 35 U.S.C. 154(b) by 0 days.

(21) Appl. No.: 09/515,406

(22) Filed: Feb. 29, 2000

(30) Foreign Application Priority Data

Mar. 2, 1999 (DE) .......................... 199 08 938

(51) Int. Cl.$^7$ .................. B01J 31/00; B01J 37/00; C08F 4/02; C08F 4/60; C08F 17/00
(52) U.S. Cl. .................. 556/53; 502/103; 502/117; 502/152; 502/155; 502/156
(58) Field of Search ................. 502/152, 154, 502/155, 167, 103, 117, 156; 526/943; 556/51, 52, 53

(56) References Cited

U.S. PATENT DOCUMENTS

| | | | |
|---|---|---|---|
| 3,112,300 A | 11/1963 | Natta | 260/93.7 |
| 3,112,301 A | 11/1963 | Natta | 260/93.7 |
| 3,175,199 A | 3/1965 | Kilburn | 340/174 |
| 4,752,597 A | 6/1988 | Turner | 502/104 |
| 4,874,880 A | 10/1989 | Miya et al. | 556/53 |
| 4,921,825 A * | 5/1990 | Kioka et al. | 502/104 |
| 5,017,714 A | 5/1991 | Welborn, Jr. | 556/12 |
| 5,026,797 A * | 6/1991 | Takahashi | 526/124 |
| 5,103,030 A | 4/1992 | Rohrmann | 556/12 |
| 5,304,614 A | 4/1994 | Winter | 526/127 |
| 5,543,535 A | 8/1996 | Lisowsky | 556/11 |
| 5,594,080 A | 1/1997 | Waymouth et al. | 526/126 |
| 5,612,462 A | 3/1997 | Lisowsky | 534/15 |
| 5,883,275 A | 3/1999 | Bingel et al. | 556/9 |
| 5,994,080 A | 11/1999 | Grobbee | 435/6 |
| 6,124,231 A * | 9/2000 | Fritze et al. | 502/152 |

FOREIGN PATENT DOCUMENTS

| | | |
|---|---|---|
| DE | 41 25 135 A1 | 2/1993 |
| EP | 129 368 | 12/1984 |
| EP | 320 762 | 6/1989 |
| EP | 416 815 | 3/1991 |
| EP | 537 686 | 4/1993 |
| EP | 669 340 | 8/1995 |
| EP | 685 485 A1 | 12/1995 |
| EP | 839 822 A2 | 5/1998 |
| WO | WO 94/11406 | 5/1994 |
| WO | WO 96/20225 | 7/1996 |

OTHER PUBLICATIONS

R.L. Kravchenko et al. "Ligand Effects in Propylene and Ethylene Polymerization with 2–Acrylindene Zirconocene Catalysts" American Chemical Society, Division of Polymer Chemistry vol. 37, No. 2 (8/96) p. 475.

R. Mülharpt et al. "Novel Elastomers and Blends via Catalytic and Controlled Polymerization Processes", International Technical Journal for Polymer Materials, (4/98) pp. 286–293.

R.L. Halterman et al. "Electronic Effects of bis(2–aryl–4,5,6,7–tetrahydroindenyl) titanocene dichlorides on the catalytic epoxidatio of trans–3–hexane" Journal of Organometallic Chemistry No. 465 (1994) pp. 175–179.

Angew. Chem. 1995, 107, 1255–1283, Brintzinger et al.
J. Org. Chem., 232 (1982) 233–247, Wild et al.
J. Am. Chem. Soc. 1984, 106, 6355–6364, Ewen.
J. Poly. Sci, vol. 30, 2601–2617 (1992) Chien et al.
Mac4omolecules 1992, 25, 6980–6987, Cheng et al.
Macromolecules 1992, 25, 1242–1253, Llinas et al.

* cited by examiner

Primary Examiner—Mark L. Bell
Assistant Examiner—J. Pasterczyk
(74) Attorney, Agent, or Firm—Keil & Weinkauf

(57) ABSTRACT

Metallocene catalysts for the preparation of polyolefins, in particular polypropylene having elastomeric properties, having specific heteroaromatics in position 2 or 3 of the indenyl system. Particular preference is given to unbridged metallocene compounds of the formula II:

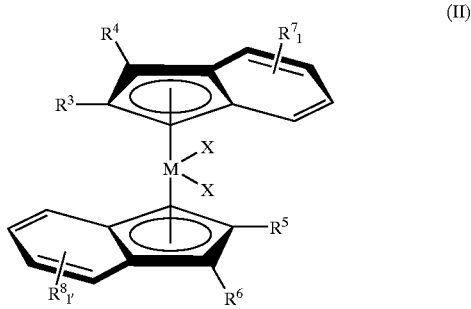

where M, X and $R^3$ to $R^8$ are defined herein.

7 Claims, No Drawings

TRANSITION METAL COMPOUND, CATALYST, ITS PRODUCTION AND ITS USE FOR THE POLYMERIZATION OF OLEFINS

The present invention relates to transition metal compounds, catalyst systems, a process for producing them and their use in the polymerization of olefins.

Metallocenes can, if desired in combination with one or more cocatalysts, be used as catalyst components for the polymerization and copolymerization of olefins. In particular, halogen-containing metallocenes which can be converted, for example, by an aluminoxane into a polymerization-active cationic metallocene complex are used as catalyst precursors (EP-A-129368).

The preparation of metallocenes is known per se (U.S. Pat. No. 4,752,597; U.S. Pat. No. 5,017,714; EP-A-320762; EP-A-416815; EP-A-537686; EP-A-669340; H. H. Brintzinger et al.; Angew. Chem., 107 (1995), 1255; H. H. Brintzinger et al., J. Organomet. Chem. 232 (1982), 233). They can be prepared, for example, by reacting cyclopentadienyl-metal compounds with halides of transition metals such as titanium, zirconium and hafnium.

Crystalline, amorphous and elastic polypropylene are known. Crystalline polypropylene usually has a dominant isotactic or syndiotactic content. In contrast, amorphous polypropylene has predominantly atactic structural elements. (U.S. Pat. No. 3,112,300 and U.S. Pat. No. 3,112,301). The preparation of elastomeric polypropylene is described in U.S. Pat. No. 3,175,199, where it is isolated from a polymer mixture of isotactic and atactic polypropylene. The elastomeric properties of this polypropylene are caused by alternating isotactic and atactic block sequences.

Metallocene catalysts are able to give, depending on the geometry of the metallocene, atactic, isotactic or syndiotactic polypropylene. It is primarily the two stereoisomers (rac isomer and meso isomer), which are usually formed in equal proportions in the synthesis, which are responsible for this. The meso form gives atactic polypropylene and its polymerization activity is usually lower than that of the rac form which gives isotactic or, depending on the substitution pattern, also syndiotactic polypropylene (J. Am. Chem. Soc. 1984, 106, 6355–6364).

Metallocenes which give polypropylene having elastomeric properties are described by Chien et al. (J. Polymer Science, Part A: Polymer Chemistry, 1992, 30, 2601–2617), and by Babu et al. (Macromolecules, 1992, 25, 6980–6987) and Dong et al. (Macromolecules, 1992, 25, 1242–1253). However, these metallocenes have low activities and give low molar masses of $M_w=200,000$.

A first breakthrough was achieved by Waymouth et al. (U.S. Pat. No. 5,994,080) who used unbridged indenyl systems which bear an aromatic ring system such as phenyl and substituted phenyl rings in position 2 on the indenyl ring. These systems have the ability to isomerize between chiral and achiral arrangements by rotation of the indenyl system during chain growth. This results in an atactic-isotactic stereoblock polypropylene having elastomeric properties.

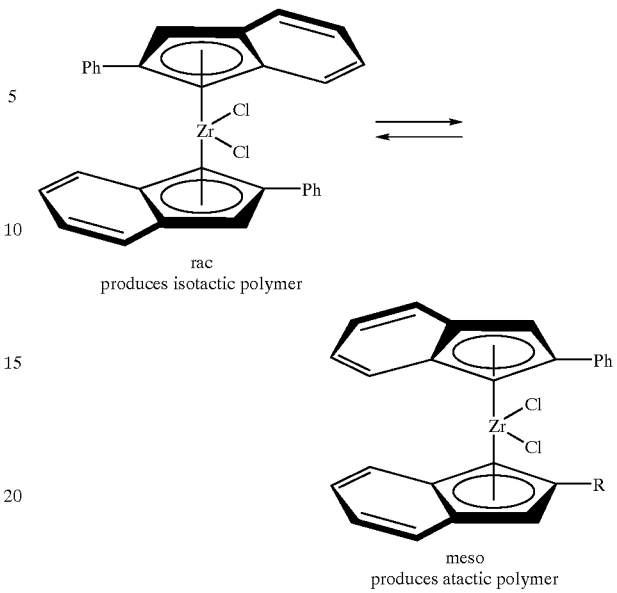

rac
produces isotactic polymer meso
produces atactic polymer

Although these metallocenes have a higher activity than the systems described up to then, these activities are not sufficient for cost-effective industrial use. It is therefore desirable to develop metallocene catalysts for the preparation of polypropylene having elastomeric properties, which catalysts have a significantly higher activity than the previously known systems.

It is an object of the present invention to find metallocenes which, after conversion into the polymerization-active species, display the abovementioned polymerization properties.

We have found that this object is achieved by metallocenes which have specific heteroaromatics in position 2 or 3 of the indenyl system.

The present invention provides compounds of the formula (I),

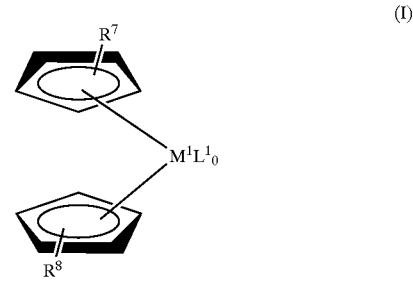

(I)

where $M^1$ is a metal of group 3, 4, 5 or 6 of the Periodic Table of the Elements, in particular Ti, Zr or Hf, $R^7$ are identical or different and are each a hydrogen atom or $Si(R^{16})_3$, where $R^{16}$ are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^7$ is a $C_1$–$C_{30}$-group such as $C_1$–$C_{25}$-alkyl, e.g. methyl, ethyl, tert-butyl, n-hexyl, cyclohexyl or octyl, $C_2$–$C_{25}$-alkenyl, $C_3$–$C_{15}$-alkylalkenyl, $C_6$–$C_{24}$-aryl, $C_4$–$C_{24}$-heteroaryl, $C_4$–$C_{24}$- alkylheteroaryl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^7$ can be joined to one another so that the radicals $R^7$ and the atoms of the cyclopentadienyl ring which connect them form a $C_4$–$C_{24}$ ring system which may in turn be substituted, $R^8$ are identical or different and are each a hydrogen atom or $Si(R^{16})_3$, where $R^{16}$ are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or $R^8$ is a $C_1$–$C_{30}$-group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl which together with the cyclopentadienyl ring form azapentalenes, thiopentalenes or phosphapentalenes, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals $R^8$ can be joined to one another so that the radicals $R^8$ and the atoms of the cyclopentadienyl ring which connect them form a $C_4$–$C_{24}$ ring system which may in turn be substituted, $L^1$ can be identical or different and are each a hydrogen atom, a $C_2$–$C_{10}$-hydrocarbon group such as $C_1$–$C_{10}$-alkyl or $C_6$–$C_{10}$-aryl, a halogen atom, or $OR^{17}$, $SR^{17}$, $OSi(R^{17})_3$, $Si(R^{17})_3$, $P(R^{17})_2$ or $N(R^{17})_2$, where $R^{17}$ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or $L^1$ is a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, preferably 2.

Preference is given to unbridged metallocene compounds of the formula (I), in particular those in which one or both cyclopentadienyl rings are substituted so that they form an indenyl ring. The indenyl ring is preferably substituted, particularly in the 2 position, 3 position, 4 position, 2,4,5 positions, 2,4,6 positions, 3,4,6 positions, 2,4,7 positions or 2,4,5,6 positions, by $C_1$–$C_{20}$-groups such as $C_1$–$C_{18}$-alkyl or $C_6$–$C_{18}$-aryl, $C_4$–$C_{24}$-heteroaryl, $C_4$–$C_{24}$-alkylheteroaryl, where two or more substituents of the indenyl ring may together form a ring system.

Particular preference is given to unbridged metallocene compounds of the formula (II),

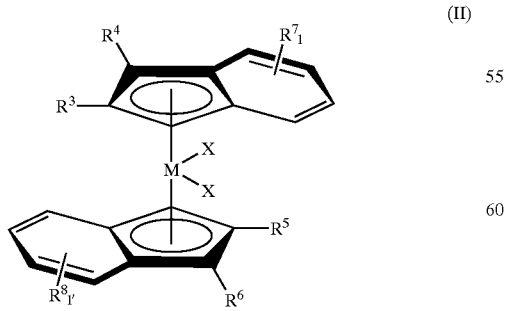

(II)

where

M is Ti, Zr or Hf, particularly preferably zirconium, $R^3$ and $R^5$ or $R^4$ and $R^6$ are identical or different and are each a hydrogen atom, a $C_1$–$C_{20}$-group, preferably $C_1$–$C_{18}$-alkyl such as methyl, ethyl, n-butyl, n-hexyl, cyclohexyl or octyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, particularly preferably $C_4$–$C_{24}$-heteroaryl, $C_4$–$C_{24}$-alkylheteroaryl such as

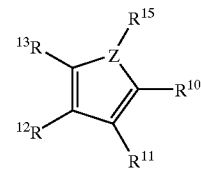

where $R^{10}$, $R^{11}$, $R^{12}$, $R^{13}$ are identical or different and are each a hydrogen atom, a $C_1$–$C_{20}$-group, preferably $C_1$–$C_{18}$-alkyl such as methyl, ethyl, n-butyl, n-hexyl, cyclohexyl or octyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl and $R^{15}$ is not present when Z=oxygen or sulfur, and when Z=nitrogen $R^{15}$ is a hydrogen atom, a $C_1$–$C_{20}$-group, preferably $C_1$–$C_{18}$-alkyl such as methyl, ethyl, n-butyl, n-hexyl, cyclohexyl or octyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, or

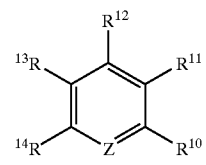

where $R^{10}$, $R^{11}$, $R^{12}$, $R^{13}$, $R^{14}$ are identical or different and are each a hydrogen atom, a $C_1$–$C_{20}$-group, preferably $C_1$–$C_{18}$-alkyl such as methyl, ethyl, n-butyl, n-hexyl, cyclohexyl or octyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, Z is a heteroatom from group 15 or 16, $R^7$, $R^8$ are identical or different and are each a hydrogen atom, a halogen atom or a $C_1$–$C_{20}$-group, preferably a linear or branched $C_1$–$C_{18}$-alkyl group such as methyl, ethyl, tert-butyl, cyclohexyl or octyl, $C_2$–$C_{10}$-alkenyl, $C_3$–$C_{15}$-alkylalkenyl, a $C_6$–$C_{18}$-aryl group which may be substituted or unsubstituted, in particular phenyl, tolyl, xylyl, tert-butylphenyl, ethylphenyl, naphthyl, acenaphthyl, phenanthrenyl or anthracenyl, $C_5$–$C_{18}$- heteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, and two radicals $R^7$ or $R^8$ may form a monocyclic or polycyclic ring system which may in turn be substituted or unsubstituted, X is a halogen atom, in particular chlorine, 1, 1' are identical or different and are each an integer from zero to 4, preferably 1 or 2, particularly preferably 1.

Very particular preference is given to unbridged metallocene compounds of the formula (II) in which M is zirconium, $R^3$, $R^5$ or $R^4$, $R^6$ are identical or different and are each a hydrogen atom or a $C_4$–$C_{24}$-heteroaryl or $C_4$–$C_{24}$-alkylheteroaryl group such as

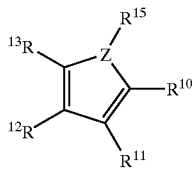

where $R^{10}$ is a hydrogen atom, a $C_1$–$C_{18}$-alkyl group such as methyl, ethyl, n-butyl, n-hexyl, cyclohexyl or octyl, or phenyl, $R^{11}$, $R^{12}$ are each a hydrogen atom, $R^{13}$ is the indenyl system bound to the metal, Z is oxygen, nitrogen or sulfur, $R^{15}$ is not present when Z=oxygen or sulfur, and when Z=nitrogen, $R^{15}$ is a hydrogen atom, methyl, ethyl, n-butyl, n-hexyl, cyclohexyl or phenyl, or

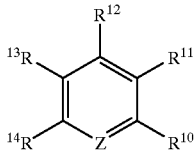

where $R^{10}$ is a hydrogen atom, a $C_1$–$C_{18}$-alkyl group such as methyl, ethyl, n-butyl, n-hexyl, cyclohexyl or octyl, or phenyl, $R^{11}$, $R^{12}$, $R^{13}$ are each a hydrogen atom, $R^{14}$ is the indenyl system bound to the metal, Z is oxygen, nitrogen or sulfur, $R^7$, $R^8$ are identical or different and are each a hydrogen atom, a halogen atom or a $C_1$–$C_{20}$-group, preferably a linear or branched $C_1$–$C_8$-alkyl group such as methyl, ethyl, tert-butyl, cyclohexyl or octyl, $C_2$–$C_6$-alkenyl, $C_3$–$C_6$-alkylalkenyl, a $C_6$–$C_{18}$-aryl group which may be substituted or unsubstituted, in particular phenyl, tolyl, xylyl, tert-butylphenyl, ethylphenyl, naphthyl, acenaphthyl, phenanthrenyl or anthracenyl, $C_5$–$C_{18}$-heteroaryl, $C_7$–$C_{12}$-arylalkyl, $C_7$–$C_{12}$-alkylaryl, fluorinated $C_1$–$C_8$-alkyl, fluorinated $C_6$–$C_{18}$-aryl, fluorinated $C_7$–$C_{12}$-arylalkyl or fluorinated $C_7$–$C_{12}$-alkylaryl, X is chlorine, 1, 1' are identical or different and are each an integer from zero to 4, preferably 1 or 2, particularly preferably 1.

Instead of the pure, chiral bridged metallocene compounds of the formula (II) (rac), the catalyst can also be produced using mixtures of the metallocenes of the formula (II) and the corresponding meso metallocenes of the formula (IIa).

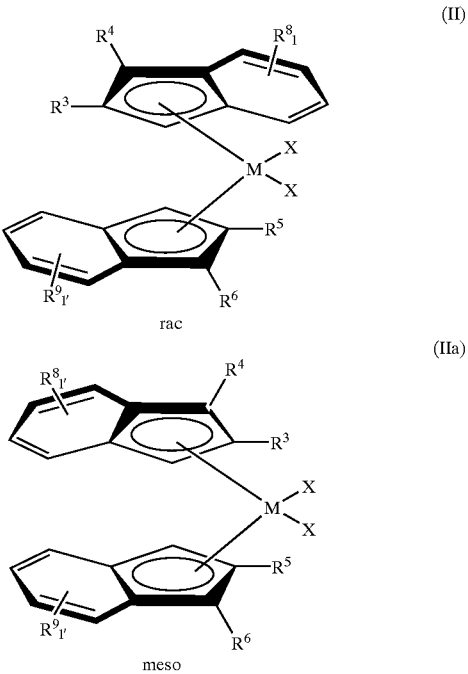

Illustrative, but not restrictive, examples of the metallocenes of the present invention are:

bis(2-(5'-methyl-2'-furyl)indenyl)zirconium dichloride, bis(2-(5'-methyl-2'-furyl) (4,5-benzoindenyl))hafnium dichloride, bis(2-(5'-methyl-2'-furyl)(4-isopropyl)indenyl)zirconium dichloride, bis(2-(5-methyl-2'-furyl)benzoindenyl)zirconium dichloride, bis(2-(5'-methyl-2'-furyl)-4-(1-naphthyl)indenyl)zirconium dichloride, bis(2-(5'-methyl-2'-furyl)-4-(2-naphthyl)indenyl)zirconium dichloride, bis(2-(5'-methyl-2'-furyl)-4-phenylindenyl)zirconium dichloride, bis(2-(5'-methyl-2'-furyl)-4-t-butylindenyl)zirconium dichloride, bis(2-(5'-methyl-2'-furyl)-4-isopropylindenyl)zirconium dichloride, bis(2-(5'-methyl-2'-furyl)-4-ethylindenyl)zirconium dichloride, bis(2-(5'-methyl-2'-furyl)-4-acenaphthindenyl)zirconium dichloride, bis(2-(5'-methyl-2'-furyl)-4-dimethylindenyl)zirconium dichloride, bis(2-(5'-methyl-2'-furyl)-4-(tert-butylphenylindenyl)zirconium dichloride, bis(2-(5'-methyl-2'-furyl)-4-(4-methylphenylindenyl)zirconium dichloride, bis(2-(5'-methyl-2'-furyl)-4-(4-ethylphenylindenyl)zirconium dichloride, bis(2-(5'-methyl-2'-furyl)-4-(4-trifluoromethylphenylindenyl)zirconium dichloride, bis(2-(5'-methyl-2'-furyl)-4-(4-methoxyphenylindenyl)zirconium dichloride, bis(2-(5'-methyl-2'-furyl)-4-(4-tert-butylphenlindenyl)dimethylzirconium, bis(2-(5'-methyl-2'-furyl)-4-(4-methylphenylindenyl)dimethylzirconium, bis(2-(5=-methyl-2'-furyl)-4-(4-ethylphenylindenyl)dimethylzirconium, bis(2-(5'-methyl-2'-furyl)-4-(4-trifluoromethylphenylindenyl)dimethylzirconium, bis(2-(5'-methyl-2'-furyl)-4-(4-methoxyphenylindenyl)dimethylzirconium, bis(2-(5'-methyl-2'-furyl)-4-(4'-tert-butylphenyl)indenyl)zirconium dichloride, bis(2-(5'-methyl-2'-furyl)-4-(4'-tert-butylphenyl)indenyl)hafnium dichloride, bis(2-(5'-methyl-2'-furyl)-4-(4'- tert-butylphenyl)indenyl)titanium dichloride, bis(2-(5'-methyl-2'-furyl)-4-(4'-methylphenyl)indenyl)zirconium dichloride, bis(2-(5'-methyl-2'-furyl)-4-(4'-ethylphenyl)indenyl)zirconium dichloride, bis(2-(5'-methyl-2'-furyl)-4-(4'-n-propylphenyl)indenyl)zirconium dichloride, bis(2-(5'-methyl-2'-furyl)-4-(4'-isopropylphenyl)indenyl)zirconium dichloride, bis(2-(5'-methyl-2'-furyl)-4-(4'-n-butylphenyl)indenyl)zirconium dichloride, bis(2-(5'-methyl-2'-furyl)-4-(4'-hexylphenyl)indenyl)zirconium dichloride, bis(2-(5'-methyl-2'-furyl)-4-(4'-sec-butylphenyl)indenyl)zirconium dichloride, bis(2-(5'-methyl-2'-furyl)-4-(4'-trimethylsilylphenyl)indenyl)zirconium dichloride, bis(2-(5'-methyl-2'-furyl)(azapentalene)zirconium dichloride, bis(2-(5'-methyl-2'-furyl)(thiapentalene)zirconium dichloride, bis(2-(5'-methyl-2'-furyl)(phosphapentalene)zirconium dichloride, (2-(5'-methyl-2'-furyl)indenyl)(2-methylazapentalene)zirconium dichloride, (2-(5'-methyl-2'-furyl)indenyl)(2-methylthiapentalene)zirconium dichloride, (2-(5'-methyl-2'-furylindenyl)(2-methylphosphapentalene)zirconium dichloride, (2-(5'-methyl-2'-furyl)indenyl)(2-ethylazapentalene)zirconium dichloride, (2-(5'-methyl-2'-furyl)indenyl)(2-ethylthiapentalene)zirconium dichloride, (2-(5'-methyl-2'-furyl)indenyl)(2-ethylphosphapentalene)zirconium dichloride, bis(2-(5'-methyl-2'-thienyl)indenyl)zirconium dichloride, bis(2-(5'-methyl-2'-thienyl)(4,5-benzoindenyl))hafnium dichloride, bis(2-(5'-methyl-2'-thienyl)(4-isopropyl)indenyl)zirconium dichloride, bis(2-(5'-methyl-2'-thienyl)benzoindenyl)zirconium dichloride, bis(2-(5'-methyl-2'-thienyl)-4-(1-naphthyl)indenyl)zirconium dichloride, bis(2-(5'-methyl-2'-thienyl)-4-(2-naphthyl)indenyl)zirconium dichloride, bis(2-(5'-methyl-2'-thienyl)-4-phenylindenyl)zirconium dichloride, bis(2-(5'-methyl-2'-thienyl)-4-t-butylindenyl)zirconium dichloride, bis(2-(5'-methyl-2'-thienyl)-4-isopropylindenyl)zirconium dichloride, bis(2-(5'-methyl-2'-thienyl)-4-ethylindenyl)zirconium dichloride, bis(2-(5'-methyl-2'-thienyl)-4-acenaphthindenyl)zirconium dichloride, bis(2-(5'-methyl-2'-thienyl)-4-dimethylindenyl)zirconium dichloride, bis(2-(5'-methyl-2'-thienyl)-4-(tert-butylphenylindenyl)zirconium dichloride, bis(2-(5'-methyl-2'-thienyl)-4-(4-methylphenylindenyl)zirconium dichloride, bis(2-(5'-methyl-2'-thienyl)-4-(4-ethylphenylindenyl)zirconium dichloride, bis(2-(5'-methyl-2'-thienyl)-4-(4-trifluoromethylphenylindenyl)zirconium dichloride, bis(2-(5'-methyl-2'-thienyl)-4-(4-methoxyphenylindenyl)zirconium dichloride, bis(2-(5'-methyl-2'-thienyl)-4-(4-tert-butylphenylindenyl)dimethylzirconium, bis(2-(5'-methyl-2'-thienyl)-4-(4-methylphenylindenyl)dimethylzirconium, bis(2-(5'-methyl-2'-thienyl)-4-(4-ethylphenylindenyl)dimethylzirconium, bis(2-(5'-methyl-2'-thienyl)-4-(4-trifluoromethylphenylindenyl)dimethylzirconium, bis(2-(5'-methyl-2'-thienyl)-4-(4-methoxyphenylindenyl)dimethylzirconium, bis(2-(5'-methyl-2'-thienyl)-4-(4'-tert-butylphenyl)indenyl)zirconium dichloride, bis(2-(5'-methyl-2'-thienyl)-4-(4'-tert-butylphenyl)indenyl)hafnium dichloride, bis(2-(5'-methyl-2'-thienyl)-4-(4'-tert-butylphenyl)indenyl)titanium dichloride, bis(2-(5'-methyl-2'-thienyl)-4-(4'-methylphenyl)indenyl)zirconium dichloride, bis(2-(5'-methyl-2'-thienyl)-4-(4'-ethylphenyl)indenyl)zirconium dichloride, bis(2-(5'-methyl-2'-thienyl)-4-(4'-n-propylphenyl)indenyl)zirconium dichloride, bis(2-(5'-methyl-2'-thienyl)-4-(4'-isopropylphenyl)indenyl)zirconium dichloride, bis(2-(5'-methyl-2'-thienyl)-4-(4'-n-butylphenyl)indenyl)zirconium dichloride, bis(2-(5'-methyl-2'-thienyl)-4-(4'-hexylphenyl)indenyl)zirconium dichloride, bis(2-(5'-methyl-2'-thienyl)-4-(4'-sec-butylphenyl)indenyl)zirconium dichloride, bis(2-(5'-methyl-2'-thienyl)4-(4'-trimethylsilylphenyl)indenyl)zirconium dichloride, bis(2-(5'-methyl-2'-thienyl)(azapentalene)zirconium dichloride, bis(2-(5'-methyl-2'-thienyl)(thiapentalene)zirconium dichloride, bis(2-(5'-methyl-2'-thienyl)(phosphapentalene)zirconium dichloride, bis(2-(5'-methyl-2'-thienyl)indenyl)(2-methylazapentalene)zirconium dichloride, bis(2-(5'-methyl-2'-thienyl)indenyl)(2-methylthiapentalene)zirconium dichloride, bis(2-(5'-methyl-2'-thienyl)indenyl(2-methylphosphapentalene)zirconium dichloride, bis(2-(5'-methyl-2'-thienyl)indenyl(2-ethylazapentalene)zirconium dichloride, bis(2-(5'-methyl-2'-thienyl)indenyl(2-ethylthiapentalene)zirconium dichloride, bis(2-(5'-methyl-2'-thienyl)indenyl(2-ethylphosphapentalene)zirconium dichloride, bis(2-(5'-methyl-2'-N-methylpyrrolyl)indenyl)zirconium dichloride, bis(2-(5'-methyl-2'-N-methylpyrrolyl)(4,5-benzoindenyl))hafnium dichloride, bis(2-(5'-methyl-2'-N-methylpyrrolyl)(4-isopropyl)indenyl)zirconium dichloride, bis(2-(5'-methyl-2'-N-methylpyrrolyl)benzoindenyl)zirconium dichloride, bis(2-(5-methyl-2'-N-methylpyrrolyl)-4-(1-naphthyl)indenyl)zirconium dichloride, bis(2-(5'-methyl-2'-N-methylpyrrolyl)-4-(2-naphthyl)indenyl)zirconium dichloride, bis(2-(5'-methyl-2'-N-methylpyrrolyl)-4-phenylindenyl)zirconium dichloride, bis(2-(5'-methyl-2'-N-methylpyrrolyl)-4-t-butylindenyl)zirconium dichloride, bis(2-(5'-methyl-2'-N-methylpyrrolyl)-4-isopropylindenyl)zirconium dichloride, bis(2-(5'-methyl-2'-N-methylpyrrolyl)-4-ethylindenyl)zirconium dichloride, bis(2-(5'-methyl-2'-N-methylpyrrolyl)-4-acenaphthindenyl)zirconium dichloride, bis(2-(5'-methyl-2'-N-methylpyrrolyl)-4-dimethylindenyl)zirconium dichloride, bis(2-(5'-methyl-2'-N-methylpyrrolyl)-4-(tert-butylphenylindenyl)zirconium dichloride, bis(2-(5'-methyl-2'-N-methylpyrrolyl)-4-(4-methylphenylindenyl)zirconium dichloride, bis(2-(5'-methyl-2'-N-methylpyrrolyl)-4-(4-ethylphenylindenyl)zirconium dichloride, bis(2-(5'-methyl-2'-N-methylpyrrolyl)-4-(4-trifluoromethylphenylindenyl)zirconium dichloride, bis(2-(5'-methyl-2'-N-methylpyrrolyl)-4-(4-methoxyphenylindenyl)zirconium dichloride, bis(2-(5'-methyl-2'-N-methylpyrrolyl)-4-(4-tert-butylphenylindenyl)dimethylzirconium, bis(2-(5'-methyl-2'-N-methylpyrrolyl)-4-(4-methylphenylindenyl)dimethylzirconium, bis(2-(5'-methyl-2'-N-methylpyrrolyl)-4-(4-ethylphenylindenyl)dimethylzirconium, bis(2-(5'-methyl-2'-N-methylpyrrolyl)-4-(4-trifluoromethylphenylindenyl)dimethylzirconium, bis(2-(5'-methyl-2'-N-methylpyrrolyl)-4-(4-methoxyphenylindenyl)dimethylzirconium, bis(2-(5'-methyl-2'-N-methylpyrrolyl)-4-(4'-tert-butylphenyl)indenyl)zirconium dichloride, bis(2-(5'-methyl-2'-N-methylpyrrolyl)-4-(4'-tert-butylphenyl)indenyl)hafnium dichloride, bis(2-(5'-methyl-2'-N-methylpyrrolyl)-4-(4'-tert-butylphenyl)indenyl)titanium dichloride, bis(2-(5'-methyl-2'-N-methylpyrrolyl)-4-(4'-methylphenyl)indenyl)

zirconium dichloride, bis(2-(5'-methyl-2'-N-methylpyrrolyl)-4-(4'-ethylphenyl)indenyl)zirconium dichloride, bis(2-(5'-methyl-2'-N-methylpyrrolyl)-4-(4'-n-propylphenyl)indenyl)zirconium dichloride, bis(2-(5'-methyl-2'-N-methylpyrrolyl)-4-(4'-isopropylphenyl)indenyl)zirconium dichloride, bis(2-(5'-methyl-2'-N-methylpyrrolyl)-4-(4'-n-butylphenyl)indenyl)zirconium dichloride, bis(2-(5'-methyl-2'-N-methylpyrrolyl)-4-(4'-hexylphenyl)indenyl)zirconium dichloride, bis(2-(5'-methyl-2'-N-methylpyrrolyl)-4-(4'-sec-butylphenyl)indenyl)zirconium dichloride, bis(2-(5'-methyl-2'-N-methylpyrrolyl)-4-(4'-trimethylsilylphenyl)indenyl)zirconium dichloride, bis(2-(5'-methyl-2'-N-methylpyrrolyl)(azapentalene)zirconium dichloride, bis(2-(5'-methyl-2'-N-methylpyrrolyl)(thiapentalene)zirconium dichloride, bis(2-(5'-methyl-2'-N-methylpyrrolyl)(phosphapentalene)zirconium dichloride, (2-(5'-methyl-2'-furyl)indenyl)(2-methylazapentalene)zirconium dichloride, (2-(5'-methyl-2'-furyl)indenyl)(2-methylthiapentalene)zirconium dichloride, (2-(5'-methyl-2'-furyl)indenyl)(2-methylphosphapentalene)zirconium dichloride, (2-(5'-methyl-2'-furyl)indenyl)(2-ethylazapentalene)zirconium dichloride, (2-(5'-methyl-2'-furyl)indenyl)(2-ethylthiapentalene)zirconium dichloride, (2-(5'-methyl-2'-furyl)indenyl)(2-ethylphosphapentalene)zirconium dichloride, bis(1-(5'-methyl-2'-furyl)indenyl)zirconium dichloride, bis(1-(5'-methyl-2'-furyl)(4,5-benzoindenyl))hafnium dichloride, bis(1-(5'-methyl-2'-furyl)(4-isopropyl)indenyl)zirconium dichloride, bis(1-(5'-methyl-2'-furyl)benzoindenyl)zirconium dichloride, bis(1-(5'-methyl-2'-furyl)-4-(1-naphthyl)indenyl)zirconium dichloride, bis(1-(5'-methyl-2'-furyl)-4-(2-naphthyl)indenyl)zirconium dichloride, bis(1-(5'-methyl-2'-furyl)-4-phenylindenyl)zirconium dichloride, bis(1-(5'-methyl-2'-furyl)-4-t-butylindenyl)zirconium dichloride, bis(1-(5'-methyl-2'-furyl)-4-isopropylindenyl)zirconium dichloride, bis(1-(5'-methyl-2'-furyl)-4-ethylindenyl)zirconium dichloride, bis(1-(5'-methyl-2'-furyl)-4-acenaphthindenyl)zirconium dichloride, bis(1-(5'-methyl-2'-furyl)-4-dimethylindenyl)zirconium dichloride, bis(1-(5'-methyl-2'-furyl)-4-(tert-butylphenylindenyl)zirconium dichloride, bis(1-(5'-methyl-2'-furyl)-4-(4-methylphenylindenyl)zirconium dichloride, bis(1-(5'-methyl-2'-furyl)-4-(4-ethylphenylindenyl)zirconium dichloride, bis(1-(5'-methyl-2'-furyl)-4-(4-trifluoromethylphenylindenyl)zirconium dichloride, bis(1-(5'-methyl-2'-furyl)-4-(4-methoxyphenylindenyl)zirconium dichloride, bis(1-(5'-methyl-2'-furyl)-4-(4-tert-butylphenylindenyl)dimethylzirconium, bis(1-(5'-methyl-2'-furyl)-4-(4-methylphenylindenyl)dimethylzirconium, bis(1-(5'-methyl-2'-furyl)-4-(4-ethylphenylindenyl)dimethylzirconium, bis(1-(5'-methyl-2'-furyl)-4-(4-trifluoromethylphenylindenyl)dimethylzirconium, bis(1-(5'-methyl-2'-furyl)-4-(4-methoxyphenylindenyl)dimethylzirconium, bis(1-(5'-methyl-2'-furyl)-4-(4'-tert-butylphenyl)indenyl)zirconium dichloride, bis(1-(5'-methyl-2'-furyl)-4-(4'-tert-butylphenyl)indenyl)hafnium dichloride, bis(1-(5'-methyl-2'-furyl)-4-(4'-tert-butylphenyl)indenyl)titanium dichloride, bis(1-(5'-methyl-2'-furyl)-4-(4'-methylphenyl)indenyl)zirconium dichloride, bis(1-(5'-methyl-2'-furyl)-4-(4'-ethylphenyl)indenyl)zirconium dichloride, bis(1-(5'-methyl-2'-furyl)-4-(4'-n-propylphenyl)indenyl)zirconium dichloride, bis(1-(5'-methyl-2'-furyl)-4-(4'-isopropylphenyl)indenyl)zirconium dichloride, bis(1-(5'-methyl-2'-furyl)-4-(4'-n-butylphenyl)indenyl)zirconium dichloride, bis(1-(5'-methyl-2'-furyl)-4-(4'-hexylphenyl)indenyl)zirconium dichloride, bis(1-(5'-methyl-2'-furyl)-4-(4'-sec-butylphenyl)indenyl)zirconium dichloride, bis(1-(5'-methyl-2'-furyl)-4-(4'-trimethylsilylphenyl)indenyl)zirconium dichloride, bis(1-(5'-methyl-2'-furyl)(azapentalene)zirconium dichloride, bis(1-(5'-methyl-2'-furyl)(thiapentalene)zirconium dichloride, bis(1-(5'-methyl-2'-furyl)(phosphapentalene)zirconium dichloride, (1-(5'-methyl-2'-furyl)indenyl)(2-methylazapentalene)zirconium dichloride, (1-(5'-methyl-2'-furyl)indenyl)(2-methylthiapentalene)zirconium dichloride, (1-(5'-methyl-2'-furylindenyl)(2-methylphosphapentalene)zirconium dichloride, (1-(5'-methyl-2'-furyl)indenyl)(2-ethylazapentalene)zirconium dichloride, (1-(5'-methyl-2'-furyl)indenyl)(2-ethylthiapentalene)zirconium dichloride, (1-(5'-methyl-2'-furyl)indenyl)(2-ethylphosphapentalene)zirconium dichloride, bis(1-(5'-methyl-2'-thienyl)indenyl)zirconium dichloride, bis(1-(5'-methyl-2'-thienyl)(4,5-benzoindenyl))hafnium dichloride, bis(1-(5'-methyl-2'-thienyl)(4-isopropyl)indenyl)zirconium dichloride, bis(1-(5'-methyl-2'-thienyl)benzoindenyl)zirconium dichloride, bis(1-(5'-methyl-2'-thienyl)-4-(1-naphthyl)indenyl)zirconium dichloride, bis(1-(5'-methyl-2'-thienyl)-4-(2-naphthyl)indenyl)zirconium dichloride, bis(1-(5'-methyl-2'-thienyl)-4-phenylindenyl)zirconium dichloride, bis(1-(5'-methyl-2'-thienyl)-4-t-butylindenyl)zirconium dichloride, bis(1-(5'-methyl-2'-thienyl)-4-isopropylindenyl)zirconium dichloride, bis(1-(5'-methyl-2'-thienyl)-4-ethylindenyl)zirconium dichloride, bis(1-(5'-methyl-2'-thienyl)-4-acenaphthindenyl)zirconium dichloride, bis(1-(5'-methyl-2'-thienyl)-4-dimethylindenyl)zirconium dichloride, bis(1-(5'-methyl-2'-thienyl)-4-(tert-butylphenylindenyl)zirconium dichloride, bis(1-(5'-methyl-2'-thienyl)-4-(4-methylphenylindenyl)zirconium dichloride, bis(1-(5'-methyl-2'-thienyl)-4-(4-ethylphenylindenyl)zirconium dichloride, bis(1-(5'-methyl-2'-thienyl)-4-(4-trifluoromethylphenylindenyl)zirconium dichloride, bis(1-(5'-methyl-2'-thienyl)-4-(4-methoxyphenylindenyl)zirconium dichloride, bis(1-(5'-methyl-2'-thienyl)-4-(4-tert-butylphenylindenyl)dimethylzirconium, bis(1-(5'-methyl-2'-thienyl)-4-(4-methylphenylindenyl)dimethylzirconium, bis(1-(5'-methyl-2'-thienyl)-4-(4-ethylphenylindenyl)dimethylzirconium, bis(1-(5'-methyl-2'-thienyl)-4-(4-trifluoromethylphenylindenyl)dimethylzirconium, bis(1-(5'-methyl-2'-thienyl)-4-(4-methoxyphenylindenyl)dimethylzirconium, bis(1-(5'-methyl-2'-thienyl)-4-(4'-tert-butylphenyl)indenyl)zirconium dichloride, bis(1-(5'-methyl-2'-thienyl)-4-(4'-tert-butylphenyl)indenyl)hafnium dichloride, bis(1-(5'-methyl-2'-thienyl)-4-(4'-tert-butylphenyl)indenyl)titanium dichloride, bis(1-(5'-methyl-2'-thienyl)-4-(4'-methylphenyl)indenyl)zirconium dichloride, bis(1-(5'-methyl-2'-thienyl)-4-(4'-ethylphenyl)indenyl)zirconium dichloride, bis(1-(5'-methyl-2'-thienyl)-4-(4'-n-propylphenyl)indenyl)zirconium dichloride, bis(1-(5'-methyl-2'-thienyl)-4-(4'-isopropylphenyl)indenyl)zirconium dichloride, bis(1-(5'-methyl-2'-thienyl)-4-(4'-n-butylphenyl)indenyl)zirconium dichloride, bis(1-(5'-methyl-2'-thienyl)-4-(4'-hexylphenyl)indenyl)zirconium dichloride, bis(1-(5'-methyl-2'-thienyl)-4-(4'-sec-butylphenyl)indenyl)zirconium dichloride, bis(1-(5'-methyl-2'-thienyl)-4-

(4'-trimethylsilylphenyl)indenyl)zirconium dichloride, bis(1-(5'-methyl-2'-thienyl)(azapentalene)zirconium dichloride, bis(1-(5'-methyl-2'-thienyl)(thiapentalene) zirconium dichloride, bis(1-(5'-methyl-2'-thienyl) (phosphapentalene)zirconium dichloride, (1-(5'-methyl-2'-thienyl)indenyl)(2-methylazapentalene) zirconium dichloride, (1-(5'-methyl-2'-thienyl)indenyl) (2-methylthiapentalene)zirconium dichloride, (1-(5'-methyl-2'-thienyl)indenyl(2-methylphosphapentalene) zirconium dichloride, (1-(5'-methyl-2'-thienyl)indenyl (2-ethylazapentalene)zirconium dichloride, (1-(5'-methyl-2'-thienyl)indenyl(2-ethylthiapentalene) zirconium dichloride, (1-(5'-methyl-2'-thienyl)indenyl (2-ethylphosphapentalene)zirconium dichloride, bis(1-(5'-methyl-2'-N-methylpyrrolyl)indenyl)zirconium dichloride, bis(1-(5'-methyl-2'-N-methylpyrrolyl)(4,5-benzoindenyl))hafnium dichloride, bis(1-(5'-methyl-2'-N-methylpyrrolyl)(4-isopropyl)indenyl)zirconium dichloride, bis(1-(5'-methyl-2'-N-methylpyrrolyl) benzoindenyl)zirconium dichloride, bis(1-(5'-methyl-2'-N-methylpyrrolyl)-4-(1-naphthyl)indenyl)zirconium dichloride, bis(1-(5'-methyl-2'-N-methylpyrrolyl)-4-(2-naphthyl)indenyl)zirconium dichloride, bis(1-(5'-methyl-2'-N-methylpyrrolyl)-4-phenylindenyl) zirconium dichloride, bis(1-(5'-methyl-2'-N-methylpyrrolyl)-4-t-butylindenyl)zirconium dichloride, bis(1-(5'-methyl-2'-N-methylpyrrolyl)-4-isopropylindenyl)zirconium dichloride, bis(1-(5'-methyl-2'-N-methylpyrrolyl)-4-ethylindenyl) zirconium dichloride, bis(1-(5'-methyl-2'-N-methylpyrrolyl)-4-acenaphthindenyl)zirconium dichloride, bis(1-(5'-methyl-2'-N-methylpyrrolyl)-4-dimethylindenyl)zirconium dichloride, bis(1-(5'-methyl-2'-N-methylpyrrolyl)-4-(tert-butylphenylindenyl)zirconium dichloride, bis(1-(5'-methyl-2'-N-methylpyrrolyl)-4-(4-methylphenylindenyl)zirconium dichloride, bis(1-(5'-methyl-2'-N-methylpyrrolyl)-4-(4-ethylphenylindenyl) zirconium dichloride, bis(1-(5'-methyl-2'-N-methylpyrrolyl)-4-(4-trifluoromethylphenylindenyl) zirconium dichloride, bis(1-(5'-methyl-2'-N-methylpyrrolyl)-4-(4-methoxyphenylindenyl) zirconium dichloride, bis(1-(5'-methyl-2'-N-methylpyrrolyl)-4-(4-tert-butylphenylindenyl) dimethylzirconium, bis(1-(5'-methyl-2'-N-methylpyrrolyl)-4-(4-methylphenylindenyl) dimethylzirconium, bis(1-(5'-methyl-2'-N-methylpyrrolyl)-4-(4-ethylphenylindenyl) dimethylzirconium, bis(1-(5'-methyl-2'-N-methylpyrrolyl)-4-(4-trifluoromethylphenylindenyl) dimethylzirconium, bis(1-(5'-methyl-2'-N-methylpyrrolyl)-4-(4-methoxyphenylindenyl) dimethylzirconium, bis(1-(5'-methyl-2'-N-methylpyrrolyl)-4-(4'-tert-butylphenyl)indenyl) zirconium dichloride, bis(1-(5'-methyl-2'-N-methylpyrrolyl)-4-(4'-tert-butylphenyl)indenyl) hafnium dichloride, bis(1-(5'-methyl-2'-N-methylpyrrolyl)-4-(4'-tert-butylphenyl)indenyl) titanium dichloride, bis(1-(5'-methyl-2'-N-methylpyrrolyl)-4-(4'-methylphenyl)indenyl) zirconium dichloride, bis(1-(5'-methyl-2'-N-methylpyrrolyl)-4-(4'-ethylphenyl)indenyl)zirconium dichloride, bis(1-(5'-methyl-2'-N-methylpyrrolyl)-4-(4'-n-propylphenyl)indenyl)zirconium dichloride, bis(1-(5'-methyl-2'-N-methylpyrrolyl)-4-(4'-isopropylphenyl)indenyl)zirconium dichloride, bis(1-(5'-methyl-2'-N-methylpyrrolyl)-4-(4'-n-butylphenyl) indenyl)zirconium dichloride, bis(1-(5'-methyl-2'-N-methylpyrrolyl)-4-(4'-hexylphenyl)indenyl)zirconium dichloride, bis(1-(5'-methyl-2'-N-methylpyrrolyl)-4-(4'-sec-butylphenyl)indenyl)zirconium dichloride, bis(1-(5'-methyl-2'-N-methylpyrrolyl)-4-(4'-trimethylsilylphenyl)indenyl)zirconium dichloride, bis(1-(5'-methyl-2'-N-methylpyrrolyl)(azapentalene) zirconium dichloride, bis(1-(5'-methyl-2'-N-methylpyrrolyl)(thiapentalene)zirconium dichloride, bis(1-(5'-methyl-2'-N-methylpyrrolyl) (phosphapentalene)zirconium dichloride, (1-(5'-methyl-2'-N-methylpyrrolyl)indenyl)(2-methylazapentalene)zirconium dichloride, (1-(5'-methyl-2'-N-methylpyrrolyl)indenyl)(2-methylthiapentalene)zirconium dichloride, (1-(5'-methyl-2'-N-methylpyrrolyl)indenyl)(2-methylphosphapentalene)zirconium dichloride, (1-(5'-methyl-2'-N-methylpyrrolyl)indenyl)(2-ethylazapentalene)zirconium dichloride, (1-(5'-methyl-2'-N-methylpyrrolyl)indenyl)(2-ethylthiapentalene) zirconium dichloride, (1-(5'-methyl-2'-N-methylpyrrolyl)indenyl)(2-ethylphosphapentalene) zirconium dichloride, bis(2-(5'-ethyl-2'-furyl)indenyl) zirconium dichloride, bis(2-(5'-ethyl-2'-furyl)(4,5-benzoindenyl))hafnium dichloride, bis(2-(5'-ethyl-2'-furyl)(4-isopropyl)indenyl)zirconium dichloride, bis(2-(5'-ethyl-2'-furyl)benzoindenyl)zirconium dichloride, bis(2-(5'-ethyl-2'-furyl)-4-(1-naphthyl)indenyl) zirconium dichloride, bis(2-(5'-ethyl -2'-furyl)-4-(2-naphthyl)indenyl)zirconium dichloride, bis(2-(5'-ethyl-2'-furyl)-4-phenylindenyl)zirconium dichloride, bis(2-(5'-ethyl-2'-furyl)-4-t-butylindenyl)zirconium dichloride, bis(2-(5'-ethyl-2'-furyl)-4-isopropylindenyl)zirconium dichloride, bis(2-(5'-ethyl-2'-furyl)-4-ethylindenyl)zirconium dichloride, bis(2-(5'-ethyl-2'-furyl)-4-acenaphthindenyl)zirconium dichloride, bis(2-(5'-ethyl-2'-furyl)-4-dimethylindenyl) zirconium dichloride, bis(2-(5'-ethyl-2'-furyl)-4-(tert-butylphenylindenyl)zirconium dichloride, bis(2-(5'-ethyl-2'-furyl)-4-(4-methylphenylindenyl)zirconium dichloride, bis(2-(5'-ethyl-2'-furyl)-4-(4-ethylphenylindenyl)zirconium dichloride, bis(2-(5'-ethyl-2'-furyl)-4-(4-trifluoromethylphenylindenyl) zirconium dichloride, bis(2-(5'-ethyl-2'-furyl)-4-(4-methoxyphenylindenyl)zirconium dichloride, bis(2-(5'-ethyl-2'-furyl)-4-(4-tert-butylphenylindenyl) dimethylzirconium, bis(2-(5'-ethyl-2'-furyl)-4-(4-methylphenylindenyl)dimethylzirconium, bis(2-(5'-ethyl-2'-furyl)-4-(4-ethylphenylindenyl) dimethylzirconium, bis(2-(5'-ethyl-2'-furyl)-4-(4-trifluoromethylphenylindenyl)dimethylzirconium, bis(2-(5'-ethyl-2'-furyl)-4-(4-methoxyphenylindenyl) dimethylzirconium, bis(2-(5'-ethyl-2'-furyl)-4-(4'-tert-butylphenyl)indenyl)zirconium dichloride, bis(2-(5'-ethyl-2'-furyl)-4-(4'-tert-butylphenyl)indenyl)hafnium dichloride, bis(2-(5'-ethyl-2'-furyl)-4-(4'-tert-butylphenyl)indenyl)titanium dichloride, bis(2-(5'-ethyl-2'-furyl)-4-(4'-methylphenyl)indenyl)zirconium dichloride, bis(2-(5'-ethyl-2'-furyl)-4-(4'-ethylphenyl) indenyl)zirconium dichloride, bis(2-(5'-ethyl-2'-furyl)-4-(4'-n-propylphenyl)indenyl)zirconium dichloride, bis(2-(5'-ethyl-2'-furyl)-4-(4'-isopropylphenyl)indenyl) zirconium dichloride, bis(2-(5'-ethyl-2'-furyl)-4-(4'-n-butylphenyl)indenyl)zirconium dichloride, bis(2-(5'-ethyl-2'-furyl)-4-(4'-hexylphenyl)indenyl)zirconium dichloride, bis(2-(5'-ethyl-2'-furyl)-4-(4'-sec-butylphenyl)indenyl)zirconium dichloride, bis(2-(5'- ethyl-2'-furyl)-4-(4'-trimethylsilylphenyl)indenyl) zirconium dichloride, bis(2-(5'-ethyl-2'-furyl)(azapentalene)zirconium dichloride, bis(2-(5'-ethyl-2'-furyl)(thiapentalene)zirconium dichloride, bis(2-(5'-ethyl-2'-furyl)(phosphapentalene)zirconium dichloride, (2-(5'-ethyl-2'-furyl)indenyl)(2-methylazapentalene)zirconium dichloride, (2-(5'-ethyl-2'-furyl)indenyl)(2-methylthiapentalene)zirconium dichloride, (2-(5'-ethyl-2'-furylindenyl)(2-methylphosphapentalene)zirconium dichloride, (2-(5'-ethyl-2'-furyl)indenyl)(2-ethylazapentalene)zirconium dichloride, (2-(5'-ethyl-2'-furyl)indenyl)(2-ethylthiapentalene)zirconium dichloride, (2-(5'-ethyl-2'-furyl)indenyl)(2-ethylphosphapentalene)zirconium dichloride, bis(2-(5'-ethyl-2'-thienyl)indenyl) zirconium dichloride, bis(2-(5'-ethyl2'-thienyl)(4,5-benzoindenyl))hafnium dichloride, bis(2-(5'-ethyl-2'-thienyl)(4-isopropyl)indenyl)zirconium dichloride, bis(2-(5'-ethyl-2'-thienyl)benzoindenyl)zirconium dichloride, bis(2-(5'-ethyl-2'-thienyl)-4-(1-naphthyl)indenyl)zirconium dichloride, bis(2-(5'-ethyl-2'-thienyl)-4-(2-naphthyl)indenyl)zirconium dichloride, bis(2-(5'-ethyl-2'-thienyl)-4-phenylindenyl)zirconium dichloride, bis(2-(5'-ethyl-2'-thienyl)-4-t-butylindenyl)zirconium dichloride, bis(2-(5'-ethyl-2'-thienyl)-4-isopropylindenyl)zirconium dichloride, bis(2-(5'-ethyl-2'-thienyl)-4-ethylindenyl)zirconium dichloride, bis(2-(5'-ethyl-2'-thienyl)-4-acenaphthindenyl)zirconium dichloride, bis(2-(5'-ethyl-2'-thienyl)-4-dimethylindenyl)zirconium dichloride, bis(2-(5'-ethyl-2'-thienyl)-4-(tert-butylphenylindenyl)zirconium dichloride, bis(2-(5'-ethyl-2'-thienyl)-4-(4-methylphenylindenyl)zirconium dichloride, bis(2-(5'-ethyl-2'-thienyl)-4-(4-ethylphenylindenyl)zirconium dichloride, bis(2-(5'-ethyl-2'-thienyl)-4-(4-trifluoromethylphenylindenyl)zirconium dichloride, bis(2-(5'-ethyl-2'-thienyl)-4-(4-methoxyphenylindenyl)zirconium dichloride, bis(2-(5'-ethyl-2'-thienyl)-4-(4-tert-butylphenylindenyl)dimethylzirconium, bis(2-(5'-ethyl-2'-thienyl)-4-(4-methylphenylindenyl)dimethylzirconium, bis(2-(5'-ethyl-2'-thienyl)-4-(4-ethylphenylindenyl)dimethylzirconium, bis(2-(5'-ethyl-2'-thienyl)-4-(4-trifluoromethylphenylindenyl)dimethylzirconium, bis(2-(5'-ethyl-2'-thienyl)-4-(4-methoxyphenylindenyl)dimethylzirconium, bis(2-(5'-ethyl-2'-thienyl)-4-(4'-tert-butylphenyl)indenyl)zirconium dichloride, bis(2-(5'-ethyl-2'-thienyl)-4-(4'-tert-butylphenyl)indenyl)hafnium dichloride, bis(2-(5'-ethyl-2'-thienyl)-4-(4'-tert-butylphenyl)indenyl)titanium dichloride, bis(2-(5'-ethyl-2'-thienyl)-4-(4'-methylphenyl)indenyl)zirconium dichloride, bis(2-(5'-ethyl-2'-thienyl)-4-(4'-ethylphenyl)indenyl)zirconium dichloride, bis(2-(5'-ethyl-2'-thienyl)-4-(4'-n-propylphenyl)indenyl)zirconium dichloride, bis(2-(5'-ethyl-2'-thienyl)-4-(4'-isopropylphenyl)indenyl)zirconium dichloride, bis(2-(5'-ethyl-2'-thienyl)-4-(4'-n-butylphenyl)indenyl)zirconium dichloride, bis(2-(5'-ethyl-2'-thienyl)-4-(4'-hexylphenyl)indenyl)zirconium dichloride, bis(2-(5'-ethyl-2'-thienyl)-4-(4'-sec-butylphenyl)indenyl)zirconium dichloride, bis(2-(5'-ethyl-2'-thienyl)-4-(4'-trimethylsilylphenyl)indenyl)zirconium dichloride, bis(2-(5'-ethyl-2'-thienyl)(azapentalene)zirconium dichloride, bis(2-(5'-ethyl-2'-thienyl)(thiapentalene)zirconium dichloride, bis(2-(5'-ethyl-2'-thienyl)(phosphapentalene)zirconium dichloride, bis(2-(5'-ethyl-2'-thienyl)indenyl)(2-methylazapentalene) zirconium dichloride, bis(2-(5'-ethyl-2'-thienyl)indenyl)(2-methylthiapentalene)zirconium dichloride, bis(2-(5'-ethyl-2'-thienyl)indenyl(2-methylphosphapentalene)zirconium dichloride, bis(2-(5'-ethyl-2'-thienyl)indenyl(2-ethylazapentalene) zirconium dichloride, bis(2-(5'-ethyl-2'-thienyl)indenyl (2-ethylthiapentalene)zirconium dichloride, bis(2-(5'-ethyl-2'-thienyl)indenyl(2-ethylphosphapentalene) zirconium dichloride, bis(2-(5'-ethyl-2'-N-methylpyrrolyl)indenyl)zirconium dichloride, bis(2-(5'-ethyl-2'-N-methylpyrrolyl)(4,5-benzoindenyl)) hafnium dichloride, bis(2-(5'-ethyl-2'-N-methylpyrrolyl)(4-isopropyl)indenyl)zirconium dichloride, bis(2-(5'-ethyl-2'-N-methylpyrrolyl) benzoindenyl)zirconium dichloride, bis(2-(5'-ethyl-2'-N-methylpyrrolyl)-4-(1-naphthyl)indenyl)zirconium dichloride, bis(2-(5'-ethyl-2'-N-methylpyrrolyl)-4-(2-naphthyl)indenyl)zirconium dichloride, bis(2-(5'-ethyl-2'-N-methylpyrrolyl)-4-phenylindenyl)zirconium dichloride, bis(2-(5'-ethyl-2'-N-methylpyrrolyl)-4-t-butylindenyl)zirconium dichloride, bis(2-(5'-ethyl-2'-N-methylpyrrolyl)-4-isopropylindenyl)zirconium dichloride, bis(2-(5'-ethyl-2'-N-methylpyrrolyl)-4-ethylindenyl)zirconium dichloride, bis(2-(5'-ethyl-2'-N-methylpyrrolyl)-4-acenaphthindenyl)zirconium dichloride, bis(2-(5'-ethyl-2'-N-methylpyrrolyl)-4-dimethylindenyl)zirconium dichloride, bis(2-(5'-ethyl-2'-N-methylpyrrolyl)-4-(tert-butylphenylindenyl) zirconium dichloride, bis(2-(5'-ethyl-2'-N-methylpyrrolyl)-4-(4-methylphenylindenyl)zirconium dichloride, bis(2-(5'-ethyl-2'-N-methylpyrrolyl)-4-(4-ethylphenylindenyl)zirconium dichloride, bis(2-(5'-ethyl-2'-N-methylpyrrolyl)-4-(4-trifluoromethylphenylindenyl)zirconium dichloride, bis(2-(5'-ethyl-2'-N-methylpyrrolyl)-4-(4-methoxyphenylindenyl)zirconium dichloride, bis(2-(5'-ethyl-2'-N-methylpyrrolyl)-4-(4-tert-butylphenylindenyl)dimethylzirconium, bis(2-(5-ethyl-2'-N-methylpyrrolyl)-4-(4-methylphenylindenyl) dimethylzirconium, bis(2-(5'-ethyl-2'-N-methylpyrrolyl)-4-(4-ethylphenylindenyl) dimethylzirconium, bis(2-(5'-ethyl-2'-N-methylpyrrolyl)-4-(4-trifluoromethylphenylindenyl) dimethylzirconium, bis(2-(5'-ethyl-2'-N-methylpyrrolyl)-4-(4-methoxyphenylindenyl) dimethylzirconium, bis(2-(5'-ethyl-2'-N-methylpyrrolyl)-4-(4'-tert-butylphenyl)indenyl) zirconium dichloride, bis(2-(5'-ethyl-2'-N-methylpyrrolyl)-4-(4'-tert-butylphenyl)indenyl) hafnium dichloride, bis(2-(5'-ethyl-2'-N-methylpyrrolyl)-4-(4'-tert-butylphenyl)indenyl) titanium dichloride, bis(2-(5'-ethyl-2'-N-methylpyrrolyl)-4-(4'-methylphenyl)indenyl) zirconium dichloride, bis(2-(5'-ethyl-2'-N-methylpyrrolyl)-4-(4'-ethylphenyl)indenyl)zirconium dichloride, bis(2-(5'-ethyl-2'-N-methylpyrrolyl)-4-(4'-n-propylphenyl)indenyl)zirconium dichloride, bis(2-(5'-ethyl-2'-N-methylpyrrolyl)-4-(4'-isopropylphenyl) indenyl)zirconium dichloride, bis(2-(5'-ethyl-2'-N-methylpyrrolyl)-4-(4'-n-butylphenyl)indenyl) zirconium dichloride, bis(2-(5'-ethyl-2'-N-methylpyrrolyl)-4-(4'-hexylphenyl)indenyl)zirconium dichloride, bis(2-(5'-ethyl-2'-N-methylpyrrolyl)-4-(4'-sec-butylphenyl)indenyl)zirconium dichloride, bis(2-(5'-ethyl-2'-N-methylpyrrolyl)-4-(4'-trimethylsilylphenyl)indenyl)zirconium dichloride, bis(2-(5'-ethyl-2'-N-methylpyrrolyl)(azapentalene)

zirconium dichloride, bis(2-(5'-ethyl-2'-N-methylpyrrolyl)(thiapentalene)zirconium dichloride, bis(2-(5'-ethyl-2'-N-methylpyrrolyl)(phosphapentalene)zirconium dichloride, (2-(5'-ethyl-2'-N-methylpyrrolyl)indenyl)(2-methylazapentalene) zirconium dichloride, (2-(5'-ethyl-2'-N-methylpyrrolyl)indenyl)(2-methylthiapentalene)zirconium dichloride, (2-(5'-ethyl-2-N-methylpyrrolyl)indenyl)(2-methylphosphapentalene)zirconium dichloride, (2-(5'-ethyl-2'-N-methylpyrrolyl)indenyl)(2-ethylazapentalene)zirconium dichloride, (2-(5'-ethyl-2'-N-methylpyrrolyl)indenyl)(2-ethylthiapentalene)zirconium dichloride, (2-(5'-ethyl-2'-N-methylpyrrolyl)indenyl)(2-ethylphosphapentalene)zirconium dichloride, bis(2-(5'-propyl-2'-furyl)indenyl)zirconium dichloride, bis(2-(5'-propyl-2'-furyl)(4,5-benzoindenyl))hafnium dichloride, bis(2-(5'-propyl-2'-furyl)(4-isopropyl)indenyl)zirconium dichloride, bis(2-(5'-propyl-2'-furyl)benzoindenyl)zirconium dichloride, bis(2-(5'-propyl-2'-furyl)-4-(1-naphthyl)indenyl)zirconium dichloride, bis(2-(5'-propyl-2'-furyl)-4-(2-naphthyl)indenyl)zirconium dichloride, bis(2-(5'-propyl-2'-furyl)-4-phenylindenyl)zirconium dichloride, bis(2-(5'-propyl-2'-furyl)-4-t-butylindenyl)zirconium dichloride, bis(2-(5'-propyl-2'-furyl)-4-isopropylindenyl)zirconium dichloride, bis(2-(5'-propyl-2'-furyl)-4-ethylindenyl)zirconium dichloride, bis(2-(5'-propyl-2'-furyl)-4-acenaphthindenyl)zirconium dichloride, bis(2-(5'-propyl-2'-furyl)-4-dimethylindenyl)zirconium dichloride, bis(2-(5'-propyl-2'-furyl)-4-(tert-butylphenylindenyl)zirconium dichloride, bis(2-(5'-propyl-2'-furyl)-4-(4-methylphenylindenyl)zirconium dichloride, bis(2-(5'-propyl-2'-furyl)-4-(4-ethylphenylindenyl)zirconium dichloride, bis(2-(5'-propyl-2'-furyl)-4-(4-trifluoromethylphenylindenyl)zirconium dichloride, bis(2-(5'-propyl-2'-furyl)-4-(4-methoxyphenylindenyl)zirconium dichloride, bis(2-(5'-propyl-2'-furyl)-4-(4-tert-butylphenylindenyl)dimethylzirconium, bis(2-(5'-propyl-2'-furyl)-4-(4-methylphenylindenyl)dimethylzirconium, bis(2-(5'-propyl-2'-furyl)-4-(4-ethylphenylindenyl)dimethylzirconium, bis(2-(5'-propyl-2'-furyl)-4-(4-trifluoromethylphenylindenyl)dimethylzirconium, bis(2-(5'-propyl-2'-furyl)-4-(4-methoxyphenylindenyl)dimethylzirconium, bis(2-(5'-propyl-2'-furyl)-4-(4'-tert-butylphenyl)indenyl)zirconium dichloride, bis(2-(5'-propyl-2'-furyl)-4-(4'-tert-butylphenyl)indenyl)hafnium dichloride, bis(2-(5'-propyl-2'-furyl)-4-(4'-tert-butylphenyl)indenyl)titanium dichloride, bis(2-(5'-propyl-2'-furyl)-4-(4'-methylphenyl)indenyl)zirconium dichloride, bis(2-(5'-propyl-2'-furyl)-4-(4'-ethylphenyl)indenyl)zirconium dichloride, bis(2-(5'-propyl-2'-furyl)-4-(4'-n-propylphenyl)indenyl)zirconium dichloride, bis(2-(5'-propyl-2'-furyl)-4-(4'-isopropylphenyl)indenyl) zirconium dichloride, bis(2-(5'-propyl-2'-furyl)-4-(4'-n-butylphenyl)indenyl)zirconium dichloride, bis(2-(5'-propyl-2'-furyl)-4-(4'-hexylphenyl)indenyl)zirconium dichloride, bis(2-(5'-propyl-2'-furyl)-4-(4'-sec-butylphenyl)indenyl)zirconium dichloride, bis(2-(5'-propyl-2'-furyl)-4-(4'-trimethylsilylphenyl)indenyl)zirconium dichloride, bis(2-(5'-propyl-2'-furyl)(azapentalene)zirconium dichloride, bis(2-(5'-propyl-2'-furyl)(thiapentalene)zirconium dichloride, bis(2-(5'-propyl-2'-furyl)(phosphapentalene)zirconium dichloride, (2-(5'-propyl-2'-furyl)indenyl)(2-methylazapentalene) zirconium dichloride, (2-(5'-propyl-2'-furyl)indenyl)(2-methylthiapentalene)zirconium dichloride, (2-(5'-propyl-2'-furyl)indenyl)(2-methylphosphapentalene)zirconium dichloride, (2-(5'-propyl-2'-furyl)indenyl)(2-ethylazapentalene) zirconium dichloride, (2-(5'-propyl-2'-furyl)indenyl)(2-ethylthiapentalene)zirconium dichloride, (2-(5'-propyl-2'-furyl)indenyl)(2-ethylphosphapentalene)zirconium dichloride, bis(2-(5'-propyl-2'-thienyl)indenyl)zirconium dichloride, bis(2-(5'-propyl-2'-thienyl)(4,5-benzoindenyl))hafnium dichloride, bis(2-(5'-propyl-2'-thienyl)(4-isopropyl)indenyl)zirconium dichloride, bis(2-(5'-propyl-2'-thienyl)benzoindenyl)zirconium dichloride, bis(2-(5'-propyl-2'-thienyl)-4-(1-naphthyl)indenyl)zirconium dichloride, bis(2-(5'-propyl-2'-thienyl)-4-(2-naphthyl)indenyl)zirconium dichloride, bis(2-(5'-propyl-2'-thienyl)-4-phenylindenyl)zirconium dichloride, bis(2-(5'-propyl-2'-thienyl)-4-t-butylindenyl)zirconium dichloride, bis(2-(5'-propyl-2'-thienyl)-4-isopropylindenyl)zirconium dichloride, bis(2-(5'-propyl-2'-thienyl)-4-ethylindenyl)zirconium dichloride, bis(2-(5'-propyl-2'-thienyl)-4-acenaphthindenyl)zirconium dichloride, bis(2-(5'-propyl-2'-thienyl)-4-dimethylindenyl)zirconium dichloride, bis(2-(5'-propyl-2'-thienyl)-4-(tert-butylphenylindenyl)zirconium dichloride, bis(2-(5'-propyl-2'-thienyl)-4-(4-methylphenylindenyl) zirconium dichloride, bis(2-(5'-propyl-2'-thienyl)-4-(4-ethylphenylindenyl)zirconium dichloride, bis(2-(5'-propyl-2'-thienyl)-4-(4-trifluoromethylphenylindenyl) zirconium dichloride, bis(2-(5'-propyl-2'-thienyl)-4-(4-methoxyphenylindenyl)zirconium dichloride, bis(2-(5'-propyl-2'-thienyl)-4-(4-tertbutylphenylindenyl) dimethylzirconium, bis(2-(5'-propyl-2'-thienyl)-4-(4-methylphenylindenyl)dimethylzirconium, bis(2-(5'-propyl-2'-thienyl)-4-(4-ethylphenylindenyl) dimethylzirconium, bis(2-(5'-propyl-2'-thienyl)-4-(4-trifluoromethylphenylindenyl)dimethylzirconium, bis(2-(5'-propyl-2'-thienyl)-4-(4-methoxyphenylindenyl)dimethylzirconium, bis(2-(5'-propyl-2'-thienyl)-4-(4'-tert-butylphenyl)indenyl)zirconium dichloride, bis(2-(5'-propyl-2'-thienyl)-4-(4'-tert-butylphenyl)indenyl) hafnium dichloride, bis(2-(5'-propyl-2'-thienyl)-4-(4'-tert-butylphenyl)indenyl)titanium dichloride, bis(2-(5'-propyl-2'-thienyl)-4-(4'-methylphenyl)indenyl) zirconium dichloride, bis(2-(5'-propyl-2'-thienyl)-4-(4'-ethylphenyl)indenyl)zirconium dichloride, bis(2-(5'-propyl-2'-thienyl)-4-(4'-n-propylphenyl)indenyl) zirconium dichloride, bis(2-(5'-propyl-2'-thienyl)-4-(4'-isopropylphenyl)indenyl)zirconium dichloride, bis(2-(5'-propyl-2'-thienyl)-4-(4'-n-butylphenyl)indenyl) zirconium dichloride, bis(2-(5'-propyl-2'-thienyl)-4-(4'-hexylphenyl)indenyl)zirconium dichloride, bis(2-(5'-propyl-2'-thienyl)-4-(4'-sec-butylphenyl)indenyl) zirconium dichloride, bis(2-(5'-propyl-2'-thienyl)-4-(4'-trimethylsilylphenyl)indenyl)zirconium dichloride, bis(2-(5'-propyl-2'-thienyl)(azapentalene)zirconium dichloride, bis(2-(5'-propyl-2'-thienyl)(thiapentalene) zirconium dichloride, bis(2-(5'-propyl-2'-thienyl) (phosphapentalene)zirconium dichloride, (2-(5'-propyl-2'-thienyl)indenyl)(2-methylazapentalene) zirconium dichloride, (2-(5'-propyl-2'-thienyl)indenyl) (2-methylthiapentalene)zirconium dichloride, (2-(5'-propyl-2'-thienyl)indenyl(2-methylphosphapentalene) zirconium dichloride, (2-(5'-propyl-2'-thienyl)indenyl (2-ethylazapentalene)zirconium dichloride, (2-(5'-propyl-2'-thienyl)indenyl(2-ethylthiapentalene) zirconium dichloride, (2-(5'-propyl-2'-thienyl)indenyl (2-ethylphosphapentalene)zirconium dichloride, bis(2-(5'-propyl-2'-N-methylpyrrolyl)indenyl)zirconium dichloride, bis(2-(5'-propyl-2'-N-methylpyrrolyl)(4,5-benzoindenyl))hafnium dichloride, bis(2-(5'-propyl-2'-N-methylpyrrolyl)(4-isopropyl)indenyl)zirconium dichloride, bis(2-(5'-propyl-2'-N-methylpyrrolyl) benzoindenyl)zirconium dichloride, bis(2-(5'-propyl-2'-N-methylpyrrolyl)-4-(1-naphthyl)indenyl)zirconium dichloride, bis(2-(5'-propyl-2'-N-methylpyrrolyl)-4-(2-naphthyl)indenyl)zirconium dichloride, bis(2-(5'-propyl-2'-N-methylpyrrolyl)-4-phenylindenyl)zirconium dichloride, bis(2-(5'-propyl-2'-N-methylpyrrolyl)-4-t-butylindenyl)zirconium dichloride, bis(2-(5'-propyl-2'-N-methylpyrrolyl)-4-isopropylindenyl)zirconium dichloride, bis(2-(5'-propyl-2'-N-methylpyrrolyl)-4-ethylindenyl)zirconium dichloride, bis(2-(5'-propyl-2'-N-methylpyrrolyl)-4-acenaphthindenyl)zirconium dichloride, bis(2-(5'-propyl-2'-N-methylpyrrolyl)-4-dimethylindenyl)zirconium dichloride, bis(2-(5'-propyl-2'-N-methylpyrrolyl)-4-(tert-butylphenylindenyl)zirconium dichloride, bis(2-(5'-propyl-2'-N-methylpyrrolyl)-4-(4-methylphenylindenyl)zirconium dichloride, bis(2-(5'-propyl-2'-N-methylpyrrolyl)-4-(4-ethylphenylindenyl)zirconium dichloride, bis(2-(5'-propyl-2'-N-methylpyrrolyl)-4-(4-trifluoromethylphenylindenyl)zirconium dichloride, bis(2-(5'-propyl-2'-N-methylpyrrolyl)-4-(4-methoxyphenylindenyl)zirconium dichloride, bis(2-(5=-propyl-2'-N-methylpyrrolyl)-4-(4-tert-butylphenylindenyl)dimethylzirconium, bis(2-(5'-propyl-2'-N-methylpyrrolyl)-4-(4-methylphenylindenyl)dimethylzirconium, bis(2-(5'-propyl-2'-N-methylpyrrolyl)-4-(4-ethylphenylindenyl)dimethylzirconium, bis(2-(5'-propyl-2'-N-methylpyrrolyl)-4-(4-trifluoromethylphenylindenyl)dimethylzirconium, bis(2-(5'-propyl-2'-N-methylpyrrolyl)-4-(4-methoxyphenylindenyl)dimethylzirconium, bis(2-(5'-propyl-2'-N-methylpyrrolyl)-4-(4'-tert-butylphenyl)indenyl)zirconium dichloride, bis(2-(5'-propyl-2'-N-methylpyrrolyl)-4-(4'-tert-butylphenyl)indenyl)hafnium dichloride, bis(2-(5'-propyl-2'-N-methylpyrrolyl)-4-(4'-tert-butylphenyl)indenyl)titanium dichloride, bis(2-(5'-propyl-2'-N-methylpyrrolyl)-4-(4'-methylphenyl)indenyl)zirconium dichloride, bis(2-(5'-propyl-2'-N-methylpyrrolyl)-4-(4'-ethylphenyl)indenyl)zirconium dichloride, bis(2-(5'-propyl-2'-N-methylpyrrolyl)-4-(4'-n-propylphenyl)indenyl)zirconium dichloride, bis(2-(5'-propyl-2'-N-methylpyrrolyl)-4-(4'-isopropylphenyl)indenyl)zirconium dichloride, bis(2-(5'-propyl-2'-N-methylpyrrolyl)-4-(4'-n-butylphenyl)indenyl)zirconium dichloride, bis(2-(5'-propyl-2'-N-methylpyrrolyl)-4-(4'-hexylphenyl)indenyl)zirconium dichloride, bis(2-(5'-propyl-2'-N-methylpyrrolyl)-4-(4'-sec-butylphenyl)indenyl)zirconium dichloride, bis(2-(5'-propyl-2'-N-methylpyrrolyl)-4-(4'-trimethylsilylphenyl)indenyl)zirconium dichloride, bis(2-(5'-propyl-2'-N-methylpyrrolyl)(azapentalene) zirconium dichloride, bis(2-(5'-propyl-2'-N-methylpyrrolyl)(thiapentalene)zirconium dichloride, bis(2-(5'-propyl-2'-N-methylpyrrolyl)(phosphapentalene)zirconium dichloride, (2-(5'-propyl-2'-N-methylpyrrolyl)indenyl)(2-methylazapentalene)zirconium dichloride, (2-(5'-propyl-2'-N-methylpyrrolyl)indenyl)(2-methylthiapentalene)zirconium dichloride, (2-(5'-propyl-2'-N-methylpyrrolyl)indenyl)(2-methylphosphapentalene)zirconium dichloride, (2-(5'-propyl-2'-N-methylpyrrolyl)indenyl)(2-ethylazapentalene)zirconium dichloride, (2-(5'-propyl-2'-N-methylpyrrolyl)indenyl)(2-ethylthiapentalene) zirconium dichloride, (2-(5'-propyl-2'-N-methylpyrrolyl)indenyl),(2-ethylphosphapentalene) zirconium dichloride, bis(2-(5'-phenyl-2'-furyl)indenyl)zirconium dichloride, bis(2-(5'-phenyl-2'-furyl)(4,5-benzoindenyl))hafnium dichloride, bis(2-(5'-phenyl-2'-furyl)(4-isopropyl)indenyl)zirconium dichloride, bis(2-(5'-phenyl-2'-furyl)benzoindenyl)zirconium dichloride, bis(2-(5'-phenyl-2'-furyl)-4-(1-naphthyl)indenyl)zirconium dichloride, bis(2-(5'-phenyl-2'-furyl)-4-(2-naphthyl)indenyl)zirconium dichloride, bis(2-(5'-phenyl-2'-furyl)-4-phenylindenyl)zirconium dichloride, bis(2-(5'-phenyl-2'-furyl)-4-t-butylindenyl)zirconium dichloride, bis(2-(5'-phenyl-2'-furyl)-4-isopropylindenyl)zirconium dichloride, bis(2-(5'-phenyl-2'-furyl)-4-ethylindenyl)zirconium dichloride, bis(2-(5'-phenyl-2'-furyl)-4-acenaphthindenyl)zirconium dichloride, bis(2-(5'-phenyl-2'-furyl)-4-dimethylindenyl)zirconium dichloride, bis(2-(5'-phenyl-2'-furyl-4-(tert-butylphenylindenyl)zirconium dichloride, bis(2-(5'-phenyl-2'-furyl)-4-(4-methylphenylindenyl)zirconium dichloride, bis(2-(5'-phenyl-2'-furyl)-4-(4-ethylphenylindenyl)zirconium dichloride, bis(2-(5'-phenyl-2'-furyl)-4-(4-trifluoromethylphenylindenyl)zirconium dichloride, bis(2-(5'-phenyl-2'-furyl)-4-(4-methoxyphenylindenyl)zirconium dichloride, bis(2-(5'-phenyl-2'-furyl)-4-(4-tert-butylphenylindenyl)dimethylzirconium, bis(2-(5'-phenyl-2'-furyl)-4-(4-methylphenylindenyl)dimethylzirconium, bis(2-(5'-phenyl-2'-furyl)-4-(4-ethylphenylindenyl)dimethylzirconium, bis(2-(5'-phenyl-2'-furyl)-4-(4-trifluoromethylphenylindenyl)dimethylzirconium, bis(2-(5'-phenyl-2'-furyl)-4-(4-methoxyphenylindenyl)dimethylzirconium, bis(2-(5'-phenyl-2'-furyl)-4-(4'-tert-butylphenyl)indenyl)zirconium dichloride, bis(2-(5'-phenyl-2'-furyl)-4-(4'-tert-butylphenyl)indenyl)hafnium dichloride, bis(2-(5'-phenyl-2'-furyl)-4-(4'-tert-butylphenyl)indenyl)titanium dichloride, bis(2-(5'-phenyl-2'-furyl)-4-(4'-methylphenyl)indenyl)zirconium dichloride, bis(2-(5'-phenyl-2'-furyl)-4-(4'-ethylphenyl)indenyl)zirconium dichloride, bis(2-(5'-phenyl-2'-furyl)-4-(4'-n-propylphenyl)indenyl)zirconium dichloride, bis(2-(5'-phenyl-2'-furyl)-4-(4'-isopropylphenyl)indenyl)zirconium dichloride, bis(2-(5'-phenyl-2'-furyl)-4-(4'-n-butylphenyl)indenyl)zirconium dichloride, bis(2-(5'-phenyl-2'-furyl)-4-(4'-hexylphenyl)indenyl)zirconium dichloride, bis(2-(5'-phenyl-2'-furyl)-4-(4'-sec-butylphenyl)indenyl)zirconium dichloride, bis(2-(5'-phenyl-2'-furyl)-4-(4'-trimethylsilylphenyl)indenyl)zirconium dichloride, bis(2-(5'-phenyl-2'-furyl)(azapentalene)zirconium dichloride, bis(2-(5'-phenyl-2'-furyl)(thiapentalene) zirconium dichloride, bis(2-(5'-phenyl-2'-furyl)(phosphapentalene)zirconium dichloride, (2-(5'-phenyl-2'-furyl)indenyl)(2-methylazapentalene) zirconium dichloride, (2-(5'-phenyl-2'-furyl)indenyl)(2-methylthiapentalene)zirconium dichloride, (2-(5'-phenyl-2'-furylindenyl)(2-methylphosphapentalene) zirconium dichloride, (2-(5'-phenyl-2'-furyl)indenyl)(2-ethylazapentalene)zirconium dichloride, (2-(5'-phenyl-2'-furyl)indenyl)(2-ethylthiapentalene)

zirconium dichloride, (2-(5'-phenyl-2'-furyl)indenyl)(2-ethylphosphapentalene)zirconium dichloride, bis(2-(5'-phenyl-2'-thienyl)indenyl)zirconium dichloride, bis(2-(5'-phenyl-2'-thienyl)(4,5-benzoindenyl))hafnium dichloride, bis(2-(5'-phenyl-2'-thienyl)(4-isopropyl)indenyl)zirconium dichloride, bis(2-(5'-phenyl-2'-thienyl)benzoindenyl)zirconium dichloride, bis(2-(5'-phenyl-2'-thienyl)-4-(1-naphthyl)indenyl)zirconium dichloride, bis(2-(5'-phenyl-2'-thienyl)-4-(2-naphthyl)indenyl)zirconium dichloride, bis(2-(5'-phenyl-2'-thienyl)-4-phenylindenyl)zirconium dichloride, bis(2-(5'-phenyl-2'-thienyl)-4-t-butylindenyl)zirconium dichloride, bis(2-(5'-phenyl-2'-thienyl)-4-isopropylindenyl)zirconium dichloride, bis(2-(5'-phenyl-2'-thienyl)-4-ethylindenyl)zirconium dichloride, bis(2-(5'-phenyl-2 r-thienyl)-4-acenaphthindenyl)zirconium dichloride, bis(2-(5'-phenyl-2'-thienyl)-4-dimethylindenyl)zirconium dichloride, bis(2-(5'-phenyl-2'-thienyl)-4-(tert-butylphenylindenyl)zirconium dichloride, bis(2-(5'-phenyl-2'-thienyl)-4-(4-methylphenylindenyl)zirconium dichloride, bis(2-(5'-phenyl-2'-thienyl)-4-(4-ethylphenylindenyl)zirconium dichloride, bis(2-(5'-phenyl-2'-thienyl)-4-(4-trifluoromethylphenylindenyl)zirconium dichloride, bis(2-(5'-phenyl-2'-thienyl)-4-(4-methoxyphenylindenyl)zirconium dichloride, bis(2-(5'-phenyl-2'-thienyl)-4-(4-tert-butylphenylindenyl)dimethylzirconium, bis(2-(5'-phenyl-2'-thienyl)-4-(4-methylphenylindenyl)dimethylzirconium, bis(2-(5'-phenyl-2'-thienyl)-4-(4-ethylphenylindenyl)dimethylzirconium, bis(2-(5'-phenyl-2'-thienyl)-4-(4-trifluoromethylphenylindenyl)dimethylzirconium, bis(2-(5'-phenyl-2'-thienyl)-4-(4-methoxyphenylindenyl)dimethylzirconium, bis(2-(5'-phenyl-2'-thienyl)-4-(4'-tert-butylphenyl)indenyl)zirconium dichloride, bis(2-(5'-phenyl-2'-thienyl)-4-(4'-tert-butylphenyl)indenyl)hafnium dichloride, bis(2-(5'-phenyl-2'-thienyl)-4-(4'-tert-butylphenyl)indenyl)titanium dichloride, bis(2-(5'-phenyl-2'-thienyl)-4-(4'-methylphenyl)indenyl)zirconium dichloride, bis(2-(5'-phenyl-2'-thienyl)-4-(4'-ethylphenyl)indenyl)zirconium dichloride, bis(2-(5'-phenyl-2'-thienyl)-4-(4'-n-propylphenyl)indenyl)zirconium dichloride, bis(2-(5'-phenyl-2'-thienyl)-4-(4'-isopropylphenyl)indenyl)zirconium dichloride, bis(2-(5'-phenyl-2'-thienyl)-4-(4'-n-butylphenyl)indenyl)zirconium dichloride, bis(2-(5'-phenyl-2'-thienyl)-4-(4'-hexylphenyl)indenyl)zirconium dichloride, bis(2-(5'-phenyl-2'-thienyl)-4-(4'-sec-butylphenyl)indenyl)zirconium dichloride, bis(2-(5'-phenyl-2'-thienyl)-4-(4'-trimethylsilylphenyl)indenyl)zirconium dichloride, bis(2-(5'-phenyl-2'-thienyl)(azapentalene)zirconium dichloride, bis(2-(5'-phenyl-2'-thienyl)(thiapentalene)zirconium dichloride, bis(2-(5'-phenyl-2'-thienyl)(phosphapentalene)zirconium dichloride, (2-(5'-phenyl-2'-thienyl)indenyl)(2-methylazapentalene)zirconium dichloride, (2-(5'-phenyl-2'-thienyl)indenyl)(2-methylthiapentalene)zirconium dichloride, (2-(5'-phenyl-2'-thienyl)indenyl(2-methylphosphapentalene)zirconium dichloride, (2-(5'-phenyl-2'-thienyl)indenyl(2-ethylazapentalene)zirconium dichloride, (2-(5'-phenyl-2'-thienyl)indenyl(2-ethylthiapentalene)zirconium dichloride, (2-(5'-phenyl-2'-thienyl)indenyl(2-ethylphosphapentalene)zirconium dichloride, bis(2-(5'-phenyl-2'-N-methylpyrrolyl)indenyl)zirconium dichloride, bis(2-(5'-phenyl-2'-N-methylpyrrolyl)(4,5-benzoindenyl))hafnium dichloride, bis(2-(5'-phenyl-2'-N-methylpyrrolyl)(4-isopropyl)indenyl)zirconium dichloride, bis(2-(5'-phenyl-2'-N-methylpyrrolyl)benzoindenyl)zirconium dichloride, bis(2-(5'-phenyl-2'-N-methylpyrrolyl)-4-(1-naphthyl)indenyl)zirconium dichloride, bis(2-(5'-phenyl-2'-N-methylpyrrolyl)-4-(2-naphthyl)indenyl)zirconium dichloride, bis(2-(5'-phenyl-2'-N-methylpyrrolyl)-4-phenylindenyl)zirconium dichloride, bis(2-(5'-phenyl-2'-N-methylpyrrolyl)-4-t-butylindenyl)zirconium dichloride, bis(2-(5'-phenyl-2'-N-methylpyrrolyl)-4-isopropylindenyl)zirconium dichloride, bis(2-(5'-phenyl-2'-N-methylpyrrolyl)-4-ethylindenyl)zirconium dichloride, bis(2-(5'-phenyl-2'-N-methylpyrrolyl)-4-acenaphthindenyl)zirconium dichloride, bis(2-(5'-phenyl-2'-N-methylpyrrolyl)-4-dimethylindenyl)zirconium dichloride, bis(2-(5'-phenyl-2'-N-methylpyrrolyl)-4-(tert-butylphenylindenyl)zirconium dichloride, bis(2-(5'-phenyl-2'-N-methylpyrrolyl)-4-(4-methylphenylindenyl)zirconium dichloride, bis(2-(5'-phenyl-2'-N-methylpyrrolyl)-4-(4-ethylphenylindenyl)zirconium dichloride, bis(2-(5'-phenyl-2'-N-methylpyrrolyl)-4-(4-trifluoromethylphenylindenyl)zirconium dichloride, bis(2-(5'-phenyl-2'-N-methylpyrrolyl)-4-(4-methoxyphenylindenyl)zirconium dichloride, bis(2-(5'-phenyl-2'-N-methylpyrrolyl)-4-(4-tert-butylphenylindenyl)dimethylzirconium, bis(2-(5'-phenyl-2'-N-methylpyrrolyl)-4-(4-methylphenylindenyl)dimethylzirconium, bis(2-(5'-phenyl-2'-N-methylpyrrolyl)-4-(4-ethylphenylindenyl)dimethylzirconium bis(2-(5'-phenyl-2'-N-methylpyrrolyl)-4-(4-trifluoromethylphenylindenyl)dimethylzirconium bis(2-(5'-phenyl-2'-N-methylpyrrolyl)-4-(4-methoxyphenylindenyl)dimethylzirconium bis(2-(5'-phenyl-2'-N-methylpyrrolyl)-4-(4'-tert-butylphenyl)indenyl)zirconium dichloride bis(2-(5'-phenyl-2'-N-methylpyrrolyl)-4-(4'-tert-butylphenyl)indenyl)hafnium dichloride bis(2-(5'-phenyl-2'-N-methylpyrrolyl)-4-(4'-tert-butylphenyl)indenyl)titanium dichloride bis(2-(5'-phenyl-2'-N-methylpyrrolyl)-4-(4'-methylphenyl)indenyl)zirconium dichloride, bis(2-(5'-phenyl-2'-N-methylpyrrolyl)-4-(4'-ethylphenyl)indenyl)zirconium dichloride, bis(2-(5'-phenyl-2'-N-methylpyrrolyl)-4-(4'-n-propylphenyl)indenyl)zirconium dichloride, bis(2-(5'-phenyl-2'-N-methylpyrrolyl)-4-(4'-isopropylphenyl)indenyl)zirconium dichloride, bis(2-(5'-phenyl-2'-N-methylpyrrolyl)-4-(4'-n-butylphenyl)indenyl)zirconium dichloride, bis(2-(5'-phenyl-2'-N-methylpyrrolyl)-4-(4'-hexylphenyl)indenyl)zirconium dichloride, bis(2-(5'-phenyl-2'-N-methylpyrrolyl)-4-(4'-sec-butylphenyl)indenyl)zirconium dichloride, bis(2-(5'-phenyl-2'-N-methylpyrrolyl)-4-(4'-trimethylsilylphenyl)indenyl)zirconium dichloride, bis(2-(5'-phenyl-2'-N-methylpyrrolyl)(azapentalene)zirconium dichloride, bis(2-(5'-phenyl-2'-N-methylpyrrolyl)(thiapentalene)zirconium dichloride, bis(2-(5'-phenyl-2'-N-methylpyrrolyl)(phosphapentalene)zirconium dichloride, (2-(5'-phenyl-2'-N-methylpyrrolyl)indenyl)(2-methylazapentalene)zirconium dichloride, (2-(5'-phenyl-2'-N-methylpyrrolyl)indenyl)(2-methylthiapentalene)zirconium dichloride, (2-(5'-phenyl-2'-N-methylpyrrolyl)indenyl)(2-methylphosphapentalene)zirconium dichloride, (2-(5'-phenyl-2'-N-methylpyrrolyl)indenyl)(2- ethylazapentalene)zirconium dichloride, (2-(5'-phenyl-2'-N-methylpyrrolyl)indenyl)(2-ethylthiapentalene) zirconium dichloride, (2-(5'-phenyl-2'-N-methylpyrrolyl)indenyl)(2-ethylphosphapentalene) zirconium dichloride, bis(2-(2'-pyridyl)indenyl) zirconium dichloride, bis(2-(2'-pyridyl)(4,5-benzoindenyl))hafnium dichloride, bis(2-(2'-pyridyl)(4-isopropyl)indenyl)zirconium dichloride, bis(2-(2'-pyridyl)benzoindenyl)zirconium dichloride, bis(2-(2'-pyridyl)-4-(1-naphthyl)indenyl)zirconium dichloride, bis(2-(2'-pyridyl)-4-(2-naphthyl)indenyl)zirconium dichloride, bis(2-(2'-pyridyl)-4-phenylindenyl) zirconium dichloride, bis(2-(2'-pyridyl)-4-t-butylindenyl)zirconium dichloride, bis(2-(2'-pyridyl)-4-isopropylindenyl)zirconium dichloride, bis(2-(2'-pyridyl)-4-ethylindenyl)zirconium dichloride, bis(2-(2'-pyridyl)-4-acenaphthindenyl)zirconium dichloride, bis(2-(2'-pyridyl)-4-dimethylindenyl)zirconium dichloride, bis(2-(2'-pyridyl)-4-(tert-butylphenylindenyl)zirconium dichloride, bis(2-(2'-pyridyl)-4-(4-methylphenylindenyl)zirconium dichloride, bis(2-(2'-pyridyl)-4-(4-ethylphenylindenyl) zirconium dichloride, bis(2-(2'-pyridyl)-4-(4-trifluoromethylphenylindenyl)zirconium dichloride, bis(2-(2'-pyridyl)-4-(4-methoxyphenylindenyl) zirconium dichloride, bis(2-(2'-pyridyl)-4-(4-tert-butylphenylindenyl)dimethylzirconium, bis(2-(2'-pyridyl)-4-(4-methylphenylindenyl) dimethylzirconium, bis(2-(2'-pyridyl)-4-(4-ethylphenylindenyl)dimethylzirconium, bis(2-(2'-pyridyl)-4-(4-trifluoroinethylphenylindenyl) dimethylzirconium, bis(2-(2'-pyridyl)-4-(4-methoxyphenylindenyl)dimethylzirconium, bis(2-(2'-pyridyl)-4-(4'-tert-butylphenyl)indenyl)zirconium dichloride, bis(2-(2'-pyridyl)-4-(4'-tert-butylphenyl) indenyl)hafnium dichloride, bis(2-(2'-pyridyl)-4-(4'-tert-butylphenyl)indenyl)titanium dichloride, bis(2-(2'-pyridyl)-4-(4'-methylphenyl)indenyl)zirconium dichloride, bis(2-(2'-pyridyl)-4-(4'-ethylphenyl) indenyl)zirconium dichloride, bis(2-(2'-pyridyl)-4-(4'-n-propylphenyl)indenyl)zirconium dichloride, bis(2-(2'-pyridyl)-4-(4'-isopropylphenyl)indenyl)zirconium dichloride, bis(2-(2'-pyridyl)-4-(4'-n-butylphenyl) indenyl)zirconium dichloride, bis(2-(2'-pyridyl)-4-(4'-hexylphenyl)indenyl)zirconium dichloride, bis(2-(2'-pyridyl)-4-(4'-sec-butylphenyl)indenyl)zirconium dichloride, bis(2-(2'-pyridyl)-4-(4'-trimethylsilylphenyl)indenyl)zirconium dichloride, bis(2-(2'-pyridyl)(azapentalene)zirconium dichloride, bis(2-(2'-pyridyl)(thiapentalene)zirconium dichloride, bis(2-(2'-pyridyl)(phosphapentalene)zirconium dichloride, (2-(2'-pyridyl)indenyl)(2-methylazapentalene) zirconium dichloride, (2-(2'-pyridyl)indenyl)(2-methylthiapentalene)zirconium dichloride, (2-(2'-pyridylindenyl)(2-methylphosphapentalene)zirconium dichloride, (2-(2'-pyridyl)indenyl)(2-ethylazapentalene)zirconium dichloride, (2-(2'-pyridyl)indenyl)(2-ethylthiapentalene)zirconium dichloride, (2-(2'-pyridyl)indenyl)(2-ethylphosphapentalene)zirconium dichloride, bis(2-(5'-methyl-2'-pyridyl)indenyl) zirconium dichloride, bis(2-(5'-methyl-2'-pyridyl)(4,5-benzoindenyl))hafnium dichloride, bis(2-(5'-methyl-2'-pyridyl)(4-isopropyl)indenyl)zirconium dichloride, bis (2-(5'-methyl-2'-pyridyl)benzoindenyl)zirconium dichloride, bis(2-(5'-methyl-2'-pyridyl)-4-(1-naphthyl) indenyl)zirconium dichloride, bis(2-(5'-methyl-2'-pyridyl)-4-(2-naphthyl)indenyl)zirconium dichloride, bis(2-(5'-methyl-2'-pyridyl)-4-phenylindenyl) zirconium dichloride, bis(2-(5'-methyl-2'-pyridyl)-4-t-butylindenyl)zirconium dichloride, bis(2-(5'-methyl-2'-pyridyl)-4-isopropylindenyl)zirconium dichloride, bis (2-(5'-methyl-2'-pyridyl)-4-ethylindenyl)zirconium dichloride, bis(2-(5'-methyl-2'-pyridyl)-4-acenaphthindenyl)zirconium dichloride, bis(2-(5'-methyl-2'-pyridyl)-4-dimethylindenyl)zirconium dichloride, bis5(2-(5'-methyl-2'-pyridyl)-4-(tert-butylphenylindenyl)zirconium dichloride, bis(2-(5'-methyl-2'-pyridyl)-4-(4-methylphenylindenyl) zirconium dichloride, bis(2-(5'-methyl-2'-pyridyl)-4-(4-ethylphenylindenyl)zirconium dichloride, bis(2-(5'-methyl-2'-pyridyl)-4-(4-trifluoromethylphenylindenyl) zirconium dichloride, bis(2-(5'-methyl-2'-pyridyl)-4-(4-methoxyphenylindenyl)zirconium dichloride, bis(2-(5'-methyl-2'-pyridyl)-4-(4-tert-butylphenylindenyl) dimethylzirconium, bis(2-(5'-methyl-2'-pyridyl)-4-(4-methylphenylindenyl)dimethylzirconium, bis(2-(5'-methyl-2'-pyridyl)-4-(4-ethylphenylindenyl) dimethylzirconium, bis(2-(5'-methyl-2'-pyridyl)-4-(4-trifluoromethylphenylindenyl)dimethylzirconium, bis (2-(5'-methyl-2'-pyridyl)-4-(4-methoxyphenylindenyl) dimethylzirconium, bis(2-(5'-methyl-2'-pyridyl)-4-(4'-tert-butylphenyl)indenyl)zirconium dichloride, bis(2-(5'-methyl-2'-pyridyl)-4-(4'-tert-butylphenyl)indenyl) hafnium dichloride, bis(2-(5'-methyl-2'-pyridyl)-4-(4'-tert-butylphenylindenyl)titanium dichloride, bis(2-(5'-methyl-2'-pyridyl)-4-(4'-methylphenyl)indenyl) zirconium dichloride, bis(2-(5'-methyl-2'-pyridyl)-4-(4'-ethylphenyl)indenyl)zirconium dichloride, bis(2-(5'-methyl-2'-pyridyl)-4-(4'-n-propylphenyl)indenyl) zirconium dichloride, bis(2-(5'-methyl-2'-pyridyl)-4-(4'-isopropylphenyl)indenyl)zirconium dichloride, bis (2-(5'-methyl-2'-pyridyl)-4-(4'-n-butylphenyl)indenyl) zirconium dichloride, bis(2-(5'-methyl-2'-pyridyl)-4-(4'-hexylphenyl)indenyl)zirconium dichloride, bis(2-(5'-methyl-2'-pyridyl)-4-(4'-sec-butylphenyl)indenyl) zirconium dichloride, bis(2-(5'-methyl-2'-pyridyl)-4-(4'-trimethylsilylphenyl)indenyl)zirconium dichloride, bis(2-(5'-methyl-2'-pyridyl)(azapentalene)zirconium dichloride, bis(2-(5'-methyl-2'-pyridyl)(thiapentalene) zirconium dichloride, bis(2-(5'-methyl-2'-pyridyl) (phosphapentalene)zirconium dichloride, (2-(5'-methyl-2'-pyridyl)indenyl)(2-methylazapentalene) zirconium dichloride, (2-(5'-methyl-2'-pyridyl)indenyl) (2-methylthiapentalene)zirconium dichloride, (2-(5'-methyl-2'-pyridyl)indenyl)(2-methylphosphapentalene)zirconium dichloride, (2-(5'-methyl-2'-pyridyl)indenyl)(2-ethylazapentalene) zirconium dichloride, (2-(5'-methyl-2'-pyridyl)indenyl) (2-ethylthiapentalene)zirconium dichloride, (2-(5'-methyl-2'-pyridyl)indenyl)(2-ethylphosphapentalene) zirconium dichloride, bis(1-(2'-pyridyl)indenyl) zirconium dichloride, bis(1-(2'-pyridyl)(4,5-benzoindenyl))hafnium dichloride, bis(1-(2'-pyridyl) (4-isopropyl)indenyl)zirconium dichloride, bis(1-(2'-pyridyl)benzoindenyl)zirconium dichloride, bis(1-(2'-pyridyl)-4-(1-naphthyl)indenyl)zirconium dichloride, bis(1-(2'-pyridyl)-4-(2-naphthyl)indenyl)zirconium dichloride, bis(1-(2'-pyridyl)-4-phenylindenyl) zirconium dichloride, bis(1-(2'-pyridyl)-4-t-butylindenyl)zirconium dichloride, bis(1-(2'-pyridyl)-4-isopropylindenyl)zirconium dichloride, bis(1-(2'-pyridyl)-4-ethylindenyl)zirconium dichloride, bis(1-(2'-pyridyl)-4-acenaphthindenyl)zirconium dichloride, bis(1-(2'-pyridyl)-4-dimethylindenyl)zirconium dichloride, bis(1-(2'-pyridyl)-4-(tert-butylphenylindenyl)zirconium dichloride, bis(1-(2'-pyridyl)-4-(4-methylphenylindenyl)zirconium dichloride, bis(1-(2'-pyridyl)-4-(4-ethylphenylindenyl) zirconium dichloride, bis(1-(2'-pyridyl)-4-(4-trifluoromethylphenylindenyl)zirconium dichloride, bis(1-(2'-pyridyl)-4-(4-methoxyphenylindenyl) zirconium dichloride, bis(1-(2'-pyridyl)-4-(4-tert-butylphenylindenyl)dimethylzirconium, bis(1-(2'-pyridyl)-4-(4-methylphenylindenyl) dimethylzirconium, bis(1-(2'-pyridyl)-4-(4-ethylphenylindenyl)dimethylzirconium, bis(1-(2'-pyridyl)-4-(4-trifluoromethylphenylindenyl) dimethylzirconium, bis(1-(2'-pyridyl)-4-(4-methoxyphenylindenyl)dimethylzirconium, bis(1-(2'-pyridyl)-4-(4'-tert-butylphenyl)indenyl)zirconium dichloride, bis(1-(2'-pyridyl)-4-(4'-tert-butylphenyl)indenyl)hafnium dichloride, bis(1-(2'-pyridyl)-4-(4'-tert-butylphenyl)indenyl)titanium dichloride, bis(1-(2'-pyridyl)-4-(4'-methylphenyl)indenyl)zirconium dichloride, bis(1-(2'-pyridyl)-4-(4'-ethylphenyl)indenyl)zirconium dichloride, bis(1-(2'-pyridyl)-4-(4'-n-propylphenyl)indenyl)zirconium dichloride, bis(1-(2'-pyridyl)-4-(4'-isopropylphenyl)indenyl)zirconium dichloride, bis(1-(2'-pyridyl)-4-(4'-n-butylphenyl)indenyl)zirconium dichloride, bis(1-(2'-pyridyl)-4-(4'-hexylphenyl)indenyl)zirconium dichloride, bis(1-(2'-pyridyl)-4-(4'-sec-butylphenyl)indenyl)zirconium dichloride, bis(1-(2'-pyridyl)-4-(4'-trimethylsilylphenyl)indenyl)zirconium dichloride, bis(1-(2'-pyridyl)(azapentalene)zirconium dichloride, bis(1-(2'-pyridyl)(thiapentalene)zirconium dichloride, bis(1-(2'-pyridyl)(phosphapentalene)zirconium dichloride, (1-(2'-pyridyl)indenyl)(2-methylazapentalene)zirconium dichloride, (1-(2'-pyridyl)indenyl)(2-methylthiapentalene)zirconium dichloride, (1-(2'-pyridylindenyl)(2-methylphosphapentalene)zirconium dichloride, (1-(2'-pyridyl)indenyl)(2-ethylazapentalene)zirconium dichloride, (1-(2'-pyridyl)indenyl)(2-ethylthiapentalene)zirconium dichloride, (1-(2'-pyridyl)indenyl)(2-ethylphosphapentalene)zirconium dichloride.

The novel metallocenes of the formulae (I) and (II) are highly active catalyst components for the polymerization of olefins. Depending on the substitution pattern of the ligands, the metallocenes can be obtained as isomer mixtures. The metallocenes can be used as pure isomers for the polymerization, but it is also possible to use the isomer mixtures.

The novel metallocenes of the formulae (I) and (II) are suitable, in particular, as constituents of catalyst systems for preparing polyolefins by polymerization of at least one olefin in the presence of a catalyst comprising at least one cocatalyst and at least one metallocene. For the purposes of the present invention, the term polymerization includes both homopolymerization and copolymerization.

The novel metallocenes of the formulae (I) and (II), particularly those of the formula (II), can be used for the polymerization of one or more olefins of the formula $R^a$—CH=CH—$R^b$, where $R^a$ and $R^b$ are identical or different and are each a hydrogen atom or a hydrocarbon having from 1 to 20 carbon atoms, in particular from 1 to 10 carbon atoms, and $R^a$ and $R^b$ together with the atoms connecting them may form one or more rings. Examples of such olefins are 1-olefins having 2–40, preferably from 2 to 10, carbon atoms, e.g. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene, ethylnorbornadiene and cyclic olefins such as norbornene, tetracyclododecene or methylnorbornene. Preference is given to homopolymerizing ethylene or propylene or copolymerizing ethylene with one or more cyclic olefins such as norbornene and/or one or more dienes having from 4 to 20 carbon atoms, e.g. 1,3-butadiene or 1,4-hexadiene. Examples of such copolymers are ethylene-norbornene copolymers, ethylene-propylene copolymers and ethylene-propylene-1,4-hexadiene copolymers. Particular preference is given to the polymerization of propylene to form a polymer having an atactic-isotactic stereoblock and elastomeric properties.

The polymerization is carried out at from −60 to 300° C., preferably from 50 to 200° C., very particularly preferably from −20 to 50° C. The pressure is from 0.5 to 2000 bar, preferably from 2 to 64 bar.

The polymerization can be carried out in solution, in bulk, in suspension or in the gas phase, continuously or batchwise, in one or more stages. Preferred embodiments are gas-phase and solution polymerization.

The catalyst used preferably comprises one of the metallocene compounds of the present invention. It is also possible to use mixtures of two or more metallocene compounds, e.g. for preparing polyolefins having a broad or multimodal molar mass distribution.

The cocatalyst which together with a novel metallocene of the formula (I) or (II) forms the catalyst system comprises at least one compound of the aluminoxane type or a Lewis acid or an ionic compound which reacts with a metallocene to convert it into a cationic compound.

The cocatalyst component which may, according to the present invention, be present in the catalyst system comprises at least one compound of the aluminoxane type or a Lewis acid or an ionic compound which reacts with a metallocene to convert it into a cationic compound.

As aluminoxane, preference is given to using a compound of the formula (III)

$$(R\,AlO)_n \qquad (III)$$

Further suitable aluminoxanes can be, for example, cyclic as in formula (IV)

(IV)

or linear as in formula (V)

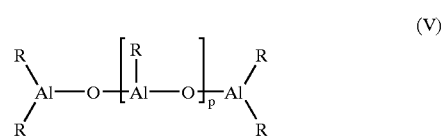

(V)

or of the cluster type as in formula (VI)

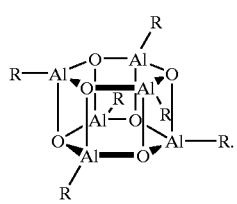

Such aluminoxanes are described, for example, in JACS 117 (1995), 6465–74, Organometallics 13 (1994), 2957–2969.

The radicals R in the formulae (III), (IV), (V) and (VI) may be identical or different and are each a $C_1$–$C_{20}$-hydrocarbon group such as a $C_1$–$C_6$-alkyl group, a $C_6$–$C_{18}$-aryl group, benzyl or hydrogen, and p is an integer from 2 to 50, preferably from 10 to 35.

The radicals R are preferably identical and are preferably methyl, isobutyl, n-butyl, phenyl or benzyl, particularly preferably methyl.

If the radicals R are different, they are preferably methyl and hydrogen, methyl and isobutyl or methyl and n-butyl, with hydrogen or isobutyl or n-butyl preferably being present in a proportion of 0.01–40% (of the number of radicals R).

The aluminoxane can be prepared in various ways by known methods. One of the methods is, for example, reacting an aluminum-hydrocarbon compound and/or a hydridoaluminum-hydrocarbon compound with water (gaseous, solid, liquid or bound—for example as water of crystallization) in an inert solvent (e.g. toluene).

To prepare an aluminoxane having different alkyl groups R, two different trialkylaluminums ($AIR_3$+$AIR'_3$) corresponding to the desired composition and reactivity are reacted with water (cf. S. Pasynkiewicz, Polyhedron 9 (1990) 429 and EP-A-0,302,424).

Regardless of the method of preparation, all aluminoxane solutions have a varying content of unreacted aluminum starting compound which is present in free form or as an adduct.

As Lewis acid, preference is given to using at least one organoboron or organoaluminum compound containing $C_1$–$C_{20}$-groups such as branched or unbranched alkyl or haloalkyl, e.g. methyl, propyl, isopropyl, isobutyl or trifluoromethyl, or unsaturated groups such as aryl or haloaryl, e.g. phenyl, tolyl, benzyl, p-fluorophenyl, 3,5-difluorophenyl, pentachorophenyl, pentafluorophenyl, 3,4,5-trifluorophenyl or 3,5-di(trifluoromethy)phenyl.

Examples of Lewis acids are trimethylaluminum, triethylaluminum, triisobutylaluminum, tributylaluminum, trifluoroborane, triphenylborane, tris(4-fluorophenyl)borane, tris(3,5-difluorophenyl)borane, tris(4-fluoromethylphenyl)borane, tris(penta-fluorophenyl)borane tris(tolyl)borane, tris(3,5-dimethylphenyl)borane, tris(3,5-difluorophenyl)borane and/or tris(3,4,5-trifluorophenyl)borane. Particular preference is given to tris(pentafluorophenyl)borane.

As ionic cocatalysts, preference is given to using compounds which contain a noncoordinating anion, for example tetrakis(pentafluorophenyl)borate, tetraphenylborate, $SbF_6$—, $CF_3SO_3$— or $ClO_4$—. Cationic counterions used are Lewis bases such as methylamine, aniline, dimethylamine, dimethylamine, N-methylaniline, diphenylamine, N,N-dimethylaniline, trimethylamine, trimethylamine, tri-n-butylamine, methyldiphenylamine, pyridine p-bromo-N,N-dimethylaniline, p-nitro-N,N-dimethylaniline, triethylphosphine, triphenylphosphine, diphenylphosphine, tetrahydrothiophene and triphenylcarbenium.

Examples of such ionic compounds which can be used according to the present invention are triethylammonium tetra(phenyl)borate, tributylammonium tetra(phenyl)borate, trimethylammonium tetra(tolyl)borate, tributylammonium tetra(tolyl)borate, tributylaomonium tetra(pentafluorophenyl)borate, tributylammonium tetra(pentafluorophenyl)aluminate, tripropylammonium tetra(dimethylphenyl)borate, tributylammonium tetra(trifluoromethylphenyl)borate, tributylammonium tetra(4-fluorophenyl)borate, N,N-dimethylanilinium tetra(phenyl)borate, N,N-diethylanilinium tetra(phenyl)borate, N,N-dimethylanilinium tetrakis(pentafluorophenyl)borate, N,N-dimethylanilinium tetrakis(pentafluorophenyl) aluminate, di(propyl)ammonium tetrakis (pentafluorophenyl)borate, di(cyclohexyl)ammonium tetrakis(pentafluorophenyl)borate, triphenylphosphonium tetrakis(phenyl)borate, triethylphosphonium tetrakis pheneyl)borate, diphenylphosphonium tetrakis (phenyl)borate, tri(methylphenyl)phosphonium tetrakis (phenyl)borate, tri(dimethylphenyl)phosphonium tetrakis(phenyl)borate, triphenylcarbenium tetrakis (pentafluorophenyl)borate, triphenylcarbenium tetrakis (pentafluorophenyl)aluminate, triphenylcarbenium tetrakis(phenyl)aluminate, ferrocenium tetrakis (pentafluorophenyl)borate and/or ferrocenium tetrakis (pentafluorophenyl)aluminate. Preference is given to triphenylcarbenium tetrakis(pentafluorophenyl)borate and/or N,N-dimethylanilinium tetrakis (pentafluorophenyl)borate.

It is also possible to use mixtures of at least one Lewis acid and at least one ionic compound.

Further useful cocatalyst components are borane or carborane compounds such as 7,8-dicarbaundecaborane(13), undecahydrido-7,8-dimethyl-7,8-dicarbaundecaborane, dodecahydrido-1-phenyl-1,3-dicarbanonaborane, tri(butyl)ammonium undecahydrido-8-ethyl-7,9-dicarbaundecaborate, 4-carbanonaborane(14), bis(tri(butyl)ammonium) nonaborate, bis(tri(butyl)ammonium) undecaborate, bis(tri(butyl)ammonium) dodecaborate, bis(tri(butyl) ammonium) decachlorodecaborate, tri(butyl) ammonium 1-carbadecaborate, tri(butyl)ammonium 1-carbadodecaborate, tri(butyl)ammonium 1-trimethylsilyl-1-carbadecaborate, tri(butyl) ammonium bis(nonahydrido-1,3-dicarbanonaborato) cobaltate(III), tri(butyl)ammonium bis(undecahydrido-7,8-dicarbaundecaborato)ferrate(III).

In the case of a heterogeneously catalyzed reaction, the support component of the catalyst system of the present invention can be any organic or inorganic, inert solid, in particular a porous support such as talc, inorganic oxides and finely divided polymer powders (e.g. polyolefins).

Suitable inorganic oxides may be found among those of groups 2, 3, 4, 5, 13, 14, 15 and 16 of the Periodic Table of the Elements. Examples of oxides preferred as supports include silicon dioxide, aluminum oxide and mixed oxides of the two elements and corresponding oxide mixtures. Other inorganic oxides which can be used either alone or in combination with the last-named preferred oxidic supports are, for example, MgO, $ZrO_2$, $TiO_2$ or $B_2O_3$, to name only a few.

The support materials used have a specific surface area in the range from 10 to 1000 $m^2/g$, a pore volume in the range from 0.1 to 5 ml/g and a mean particle size of from 1 to 500 µm. Preference is given to supports having a specific surface area in the range from 50 to 500 m²/g, a pore volume in the range from 0.5 to 3.5 ml/g and a mean particle size in the range from 5 to 350 µm. Particular preference is given to supports having a specific surface area in the range from 200 to 400 m²/g, a pore volume in the range from 0.8 to 3.0 ml/g and a mean particle size of from 10 to 200 µm.

If the support material used naturally has a low moisture content or residual solvent content, dehydration or drying before use can be omitted. If this is not the case, for example when using silica gel as support material, dehydration or drying is advisable. Thermal dehydration or drying of the support material can be carried out under reduced pressure and simultaneous blanketing with inert gas (e.g. nitrogen). The drying temperature is in the range from 100 to 100° C., preferably from 200 to 800° C. In this case, the pressure is not critical. The duration of the drying process can be from 1 to 24 hours. Shorter or longer drying times are possible, provided that equilibrium with the hydroxyl groups on the support surface can be established under the conditions selected, which normally takes from 4 to 8 hours.

Dehydration or drying of the support material can also be carried out by chemical means, by reacting the. adsorbed water and the hydroxyl groups on the surface with suitable passivating agents. The reaction with the passivating reagent enables the hydroxyl groups to be converted completely or partly into a form which leads to no adverse interaction with the catalytically active centers. Suitable passivating agents are, for example, silicon halides and silanes, e.g. silicon tetrachloride, chlorotrimethylsilane, dimethylaminotrichlorosilane, or organometallic compounds of aluminum, boron and magnesium, for example trimethylaluminum, triethylaluminum, triisobutylaluminum, triethylborane, dibutylmagnesium. Chemical dehydration or passivation of the support material is carried out, for example, by reacting, in the absence of air and moisture, a suspension of the support material in a suitable solvent with the passivating reagent in pure form or as a solution in a suitable solvent. Suitable solvents are, for example, aliphatic or aromatic hydrocarbons such as pentane, hexane, heptane, toluene or xylene. Passivation is carried out at from 25° C. to 120° C., preferably from 50 to 70° C. Higher and lower temperatures are also possible. The reaction time is from 30 minutes to 20 hours, preferably from 1 to 5 hours. After the chemical dehydration is complete, the support material is isolated by filtration under inert conditions, washed one or more times with suitable inert solvents as described above and subsequently dried in a stream of inert gas or under reduced pressure.

Organic support materials such as finely divided polyolefin powders (e.g. polyethylene, polypropylene or polystyrene) can also be used and should likewise be freed of adhering moisture, solvent residues or other impurities before use by means of appropriate purification and drying operations.

According to the present invention, the catalyst system is produced by mixing at least one metallocene as rac/meso isomer mixture, at least one cocatalyst and at least one passivated support.

To prepare the supported catalyst system, at least one of the above-described metallocene components is brought into contact in a suitable solvent with at least one cocatalyst component, preferably giving a soluble reaction product, an adduct or a mixture. The preparation obtained in this way is then mixed with the dehydrated or passivated support material, the solvent is removed and the resulting supported metallocene catalyst system is dried to ensure that the solvent is completely or mostly removed from the pores of the support material. The supported catalyst is obtained as a free-flowing powder.

A process for producing a free-flowing and, if desired, prepolymerized supported catalyst system comprises the following steps:

a) preparation of a metallocene/cocatalyst mixture in a suitable solvent or suspension medium, where the metallocene component has one of the above-described structures;

b) application of the metallocene/cocatalyst mixture to a porous, preferably inorganic dehydrated support;

c) removal of the major part of the solvent from the resulting mixture;

d) isolation of the supported catalyst system;

e) if desired, prepolymerization of the supported catalyst system obtained using one or more olefinic monomer(s) so as to obtain a prepolymerized supported catalyst system.

Preferred solvents for preparing the metallocene/cocatalyst mixture are hydrocarbons and hydrocarbon mixtures which are liquid at the reaction temperature selected and in which the individual components preferably dissolve. However, solubility of the individual components is not a prerequisite as long as it is ensured that the reaction product of metallocene and cocatalyst components is soluble in the solvent chosen. Examples of suitable solvents encompass alkanes such as pentane, isopentane, hexane, heptane, octane and nonane; cycloalkanes such as cyclopentane and cyclohexane; and aromatics such as benzene, toluene, ethylbenzene and diethylbenzene. very particular preference is given to toluene.

The amounts of aluminoxane and metallocene used for producing the supported catalyst system can be varied within a wide range. Preference is given to using a molar ratio of aluminum to the transition metal in the metallocene of from 10:1 to 1000:1, very particularly preferably from 50:1 to 500:1.

In the case of methylaluminoxane, preference is given to using 30% strength solutions in toluene; however, the use of 10% strength solutions is also possible.

To preactivate the metallocene, the solid metallocene is dissolved in a solution of the aluminoxane in a suitable solvent. It is also possible to dissolve the metallocene separately in a suitable solvent and subsequently to combine this solution with the aluminoxane solution. Preference is given to using toluene.

The preactivation time is from 1 minute to 200 hours.

The preactivation can take place at room temperature (25° C.). The use of higher temperatures can, in particular cases, shorten the preactivation time required and effect an additional increase in the activity. In this case, higher temperatures means a range from 50 to 100° C.

The preactivated solution or the metallocene/cocatalyst mixture is subsequently combined with an inert support material, usually silica gel, in the form of a dry powder or as a suspension in one of the abovementioned solvents. The support material is preferably used as a powder. The order of addition is unimportant. The preactivated metallocene/cocatalyst solution or the metallocene/cocatalyst mixture can be added to the support material or else the support material can be introduced into the solution.

The volume of the preactivated solution or metallocene/cocatalyst mixture can exceed 100% of the total pore volume of the support material used or else be up to 100% of the total pore volume.

The temperature at which the preactivated solution or metallocene/cocatalyst mixture is brought into contact with the support material can vary within a range from 0 to 100° C., although higher or lower temperatures are also possible.

Subsequently, all or most of the solvent is removed from the supported catalyst system, with the mixture being able to be stirred and, if desired, heated. Preference is given to removing both the visible proportion of solvent and also that present in the pores of the support material. Removal of the solvent can be carried out in a conventional manner using reduced pressure and/or purging with inert gas. In the drying process, the mixture can be heated until the free solvent has been removed, which usually takes from 1 to 3 hours at a temperature of preferably from 30 to 60° C. The free solvent is the visible proportion of solvent in the mixture, and residual solvent is the proportion which is enclosed in the pores.

As an alternative to complete removal of solvent, it is also possible to dry the supported catalyst system only to a certain residual solvent content, with the free solvent having been completely removed. The supported catalyst system can subsequently be washed with a low-boiling hydrocarbon such as pentane or hexane and dried again.

The supported catalyst system obtained can either be used directly for the polymerization of olefins or be prepolymerized using one or more olefinic monomers prior to its use in a polymerization process. The prepolymerization of supported catalyst systems is described, for example, in WO 94/28034.

As additive, it is possible to add a small amount of an olefin, preferably an α-olefin (for example styrene or phenyldimethylvinylsilane) as activity-increasing component or, for example, an antistatic during or after production of the supported catalyst system.

As antistatic, it is usual to use a mixture of a metal salt of Medialan acid, a metal salt of anthranilic acid and a polyamine. Such antistatics are described, for example, in EP-A-0,636,636.

The molar ratio of additive to metallocene component compound (I)is preferably from 1:1000 to 1000:1, very particularly preferably from 1:20 to 20:1.

The present invention also provides a process for preparing a polyolefin by polymerization of one or more olefins in the presence of a catalyst system comprising at least one transition metal component in the form of the novel metallocenes of the formula (I) or (II). For the purposes of the present invention, the term polymerization covers both homopolymerization and copolymerization.

Compared to the dihalo compounds, the compounds of the present invention display at least equal, but sometimes higher, activities in the polymerization of olefins.

The catalyst system described can be used as sole catalyst component for the polymerization of olefins having from 2 to 20 carbon atoms, but is preferably used in combination with at least one alkyl compound of the elements of main groups I to III of the Periodic Table, e.g. an aluminum alkyl, magnesium alkyl or lithium alkyl or an aluminoxane. The alkyl compound is added to the monomer or suspension medium and serves to free the monomer of substances which can adversely affect the catalyst activity. The amount of alkyl compound added depends on the quality of the monomers used.

As molar mass regulator and/or to increase the activity, hydrogen is added if necessary.

In the polymerization, the antistatic can be metered into the polymerization system either together with or separately from the catalyst system used.

The polymers prepared using the catalyst system comprising at least one of the metallocenes of the present invention display a uniform particle morphology and contain no fines. In the polymerization using the catalyst system, no deposits or caking are observed.

The catalyst system gives polymers such as polypropylene which have an extraordinarily high stereospecificity and regiospecificity and, owing to their atactic-isotactic stereoblock, possess elastomeric properties.

The invention is illustrated by the following examples which do not, however, restrict the scope of the invention.

General procedures: Preparation and handling of organometallic compounds was carried out with exclusion of air and moisture under argon (Schlenk technique or glove box). All solvents required were purged with argon and dried over molecular sieves before use.

EXAMPLE 1

1-(2'-Pyridyl)indan-1-ol (1)

48.0 ml (81.0 mmol) of a 1.6 molar n-butyllithium solution in n-hexane are placed in a Schlenk flask. The solution is cooled to −60° C. and 12.8 g (81.0 mmol) of 2-bromopyridine dissolved in 50 ml of diethyl ether are slowly added dropwise. The reaction solution is stirred at this temperature for 20 minutes. Subsequently, 10.0 g (81.0 mmol) of 1-indanone are dissolved in 70 ml of diethyl ether and added dropwise to the above mixture over a period of 20 minutes. During the reaction time of two hours, the temperature is held in the range from −400 to −60° C. The cooling bath is subsequently removed and the mixture is allowed to warm to room temperature. It is then hydrolyzed by addition of 50 ml of saturated ammonium chloride solution. The aqueous phase is extracted three times with 50 ml each time of diethyl ether, and the combined ether phases are dried over magnesium sulfate. The solvent is removed on a rotary evaporator until about 50 ml of solution remain, and the desired product crystallizes out overnight at 8° C. Recrystallization from diethyl ether gives 12.4 g (58 mmol, 72%) of a light-yellow crystalline solid.

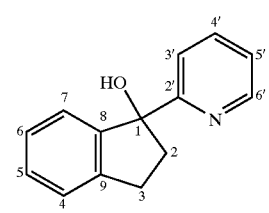

1

$^1$H-NMR (d$_1$-chloroform, 599.9 MHz): δ (ppm)=8.54 (ddd, 1H, 6'-H, 3J=4.8 Hz, 4J=1.2 Hz, 5J=0.6 Hz), 7.57 (ddd, 1H, 4'-H, 3J=7.8 Hz, 3J 7.8 Hz, 4J=1.2 Hz), 7.31 (d, 1H, 7-H, 3J=7.2 Hz), 7.26 (ddd, 1H, 6-H, 3J=7.8 Hz, 3J=7.2 Hz, 4J=1.2 Hz), 7.16 (each m, each 1H, 5-H, 5'-H), 7.02 (dd, 1H, 4-H, 3J=8.4 Hz, 4J=1.2 Hz), 7.01 (dd, 1H, 3'-H, 3J=7.8 Hz, 4J=1.2 Hz), 5.94 (b, 1H, OH), 3.24, 3.03 (m, each 1H, 3-H), 2.52 (m, 2H, 2-H). 13C-NMR (d$_1$-chloroform, 150.8 MHz): δ (ppm)=164.2 (C, C-2'), 147.6 (C, C-9), 147.3 (CH, C-6'), 143.9 (C, C-8), 137.1 (CH, C-4'), 128.5 (CH, C-6), 127.2 (CH, C-5), 125.0 (CH, C-7), 124.2 (CH, C-4), 122.3 (CH, C-5'), 120.4 (CH, C-3'), 84.4 (C, C-1), 43.0 (CH$_2$, C-2), 30.4 (CH$_2$, C-3). Melting point: 80° C,; Elemental analysis: calc.: C: 79.59% H: 6.20% N: 6.63%; C$_{14}$H$_{13}$NO found: C: 79.42% H: 6.27% N: 6.68%.

EXAMPLE 2

3-(2'-Pyridyl)indene (2)

Using a modified literature method (J. Chem. Soc. 1958, 325–337), 100 ml of 80 percent strength sulfuric acid are added dropwise at 0° C. to 10.0 g (47.0 mmol) of 1-(2'-pyridyl)indan-1-ol (1). The resulting deep red solution is then stirred for two hours at 0° C. and subsequently poured onto 150 g of ice. This reaction mixture is then carefully neutralized using solid sodium hydroxide. The aqueous phase is shaken three times with 70 ml each time of diethyl ether and the combined organic phases are dried over magnesium sulfate. The solvent is removed on a rotary evaporator until about 100 ml of solution remain. The desired product crystallizes out overnight as a yellow solid. Recrystallization from diethyl ether gives 7.08 g (36.6 mmol, 78%) of a white solid.

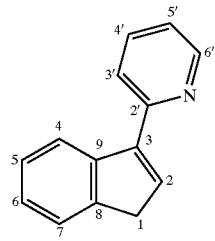

2

1H-NMR (d$_2$-dichloromethane, 200.13 MHz): δ (ppm)= 8.72 (d, 1H, 6'-H, 3J=4.6 Hz), 8.23 (d, 1H, 4-H, 3J=6.6 Hz), 7.75 (m, 2H, 5-H, 3'-H), 7.53 (d, 1H, 7-H, 3J=7.2 Hz), 7.38–7.18 (m, 3H, 4'-H, 5'-H, 6-H), 7.01 (m, 1H, 2-H), 3.56 (d, 2H, 1-H, 3J=45 2.2 Hz). 1H-NMR (d$_6$-benzene, 599.9 MHz): δ (ppm)=8.71 (d, 1H, 4-H, 3J=7.8 Hz), 8.60 (ddd, 1H, 6'-H, 3J=4.8 Hz, 4J=1.2 Hz, 5J=0.6 Hz), 7.36 (ddd, 1H, 5-H, 3J=7.8 Hz, 3J=7.8 Hz, 4J=1.2 Hz), 7.34 (ddd, 1-H, 3'-H, 3J=8.4 Hz, 4J=1.2 Hz, 5J=0.6 Hz), 7.32 (ddd, 1H, 7-H, 3J=7.2 Hz, 4J=1.2 Hz, 5J=0.6 Hz), 7.20 (ddd, 1H, 6-H, 3J=7.8 Hz, 3J=7.2 Hz, 4J=1.2 Hz), 7.11 (ddd, 1H, 4'-H, 3J=8.4 Hz, 3J=7.2 Hz, 4J=1.2 Hz), 6.67 (ddd, 1H, 5'-H, 3J=7.2 Hz, 3J=4.8 Hz, 4J=1.2 Hz), 6.65 (t, 1H, 2-H, 3J=1.8 Hz), 3.11 (d, 2H, 1-H, 3J=1.8 Hz). 13C-NMR (d$_6$-benzene, 150.8 MHz): δ (ppm)=155.6 (C, C-2'), 149.5 (CH, C-6'), 145.0 (C, C-8), 144.5 (C, C-3), 143.6 (C, C-9), 135.9 (CH, C-4'), 133.5 (CH, C-2), 126.6 (CH, C-5), 125.4 (CH, C-6), 124.0 (CH, C-7), 123.7 (CH, C-4), 121.9 (CH, C-5'), 121.7 (CH, C-3'), 38.2 (CH$_2$, C-1). 15N-NMR (d$_6$-benzene, 60.0 MHz): δ (ppm)=−69.5 (pyridyl N). Melting point: 80° C.; Elemental analysis: calc.: C: 87.01% H: 5.74% N: 7.25%; C$_{14}$H$_{11}$N found: C: 86.03% H: 5.62% N: 7.20%.

EXAMPLE 3

2-(2'-Pyridyl)indan-2-ol (3)

6.40 g (40.0 mmol) of 2-bromopyridine in 50 ml of diethyl ether are added dropwise at −40° C. to 24.0 ml (40.0 mmol) of a 1.60 molar n-butyllithium solution in n-hexane. The reaction solution is stirred at this temperature for a further 20 minutes.

14.0 g (105 mmol) of 2-indanone dissolved in 50 ml of diethyl ether are added to the above solution over a period of 20 minutes. During the reaction time of four hours, the temperature is kept in a range from −40° C. to −25° C. The mixture is subsequently hydrolyzed using 50 ml of saturated ammonium chloride solution, the cooling bath is removed and the mixture is warmed to room temperature.

Afer separation of the phases, the aqueous phase is extracted three times with 50 ml each time of diethyl ether, and the combined ether phases are dried over magnesium sulfate. The solvent is removed on a rotary evaporator until about 50 ml of solution remain, and the desired product crystallizes out overnight at 8° C. Recrystallization from diethyl ether gives white needles. However, complete crystallization of the product does not occur, so that purification of the remaining solution by column chromatography on silica gel using isohexane/diethyl ether 1:1 as eluant gives further white solid. The two purification steps together give 5.80 g (27.5 mmol, 26%) of the desired product. The R$_f$ in isohexane/diethyl ether 1:1 is 0.3.

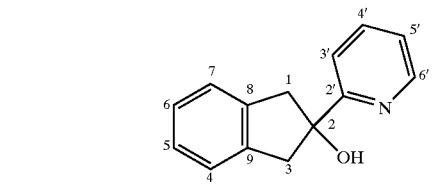

3

1H-NMR (d$_1$-chloroform, 599.9 MHz): δ (ppm)=8.53 (ddd, 1H, 6'-H, 3J=4.8 Hz, 4J=1.2 Hz, 5J=0.6 Hz), 7.63 (ddd, 1H, 4'-H, 3J=15 7.8 Hz, 3J=7.2 Hz, 4J=1.2 Hz), 7.30 (ddd, 1H, 3'-H, 3J=7.8 Hz, 4J=1.2 Hz, 5J=0.6 Hz), 7.24–7.20 (m, 5H, 4-H, 5-H, 6-H, 7-H, 5'-H), 5.29 (b, 1H, OH), 3.39 (m, 4H, 1-H, 3-H). 13 C-NMR (d$_1$-chloroform, 150.8 MHz): δ (ppm)=164.2 (C, C-2'), 147.3 (CH, C-6'), 141.1 (2C, C-8, C-9), 137.1 (CH, C-4'), 126.8 (2CH, C-5, C-6), 124.6 (2CH, C-4, C-7), 122.2 (CH, C-5'), 118.9 (CH, C-3'), 82.4 (C, C-2), 49.0 (2CH$_2$, C-1, C-3). Melting point: 119° C.; Elemental analysis: calc.: C: 79.59% H: 6.20% N: 6.63%; C$_{14}$H$_{13}$NO found: C: 79.44% H: 6.03% N: 6.67%.

EXAMPLE 4

2-(2'-Pyridyl)indene (4)

1.4 g (6.6 mmol) of 2-(2'-pyridyl)indan-2-ol (3) are placed in a 100 ml round-bottomed flask. 20 ml of 85 percent strength sulfuric acid which has been cooled beforehand to 0° C. in an ice/water bath are slowly added dropwise at 0° C. On addition of a few drops of sulfuric acid, a red coloration is immediately observed. After a reaction time of 2 hours, the solution is poured onto 50 g of ice and neutralized using sodium hydroxide pellets. The mixture is subsequently extracted three times with 50 ml of diethyl ether and the combined organic phases are dried over sodium sulfate. The product can be purified by column chromatography on silica gel using isohexane/diethyl ether in a ratio of 2:1 as eluant. This gives 500 mg (2.6 mmol) of a slightly yellowish solid. The yield is thus 39%. The R$_f$ in isohexane/diethyl ether 1:1 is 0.45.

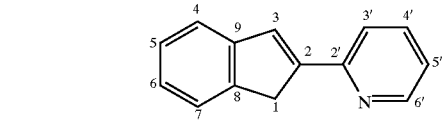

4

1H-NMR (d$_6$-benzene, 599.9 MHz): δ (ppm)=8.52 (ddd, 1H, 6'-H, 3J=4.8 Hz, 4J 1.2 Hz, 5J=0.6 Hz), 7.49 (s, 1H, 3-H), 7.31 (d, 1H, 4-H, 3J=7.2 Hz), 7.26 (dd, 1H, 7-H, 3J=7.8 Hz, 4J=1.2 Hz), 7.18 (ddd, 1H, 5-H, 3J=7.8 Hz, 3J=7.2 Hz, 4J=1.2 Hz), 7.14 (ddd, 1H, 3'-H, 3J=7.8 Hz , 4J=1.2 Hz, 5J=0.6 Hz), 7.10 (ddd, 1H, 6-H, 3J=7.8 Hz, 3J=7.8 Hz, 4J=1.2 Hz), 7.07 (ddd, 1H, 4'-H, 3J=7.8 Hz, 3J=7.2 Hz, 4J=1.2 Hz), 6.59 (ddd, 1H, 5'-H, 3J=7.2 Hz, 3J=4.8 Hz, 4J=1.2 Hz), 3.77 (s, 2H, 3-H). 13C-NMR (d$_6$-benzene, 150.8 MHz): δ (ppm)=154.6 (C, C-2'), 149.6 (CH, C-6'), 147.2 (C, C-2), 145.1 (C, C-9), 144.1 (C, C-8), 135.5 (CH, C-4'), 130.3 (CH, C-3), 126.6 (CH, C-5), 125.5 (CH, C-6), 124.0 (CH, C-7), 121.8 (CH, C-4), 121.4 (CH, C-5'), 119.8 (CH, C-3'), 38.8 (CH$_2$, C-1). IR (KBr): ν (cm$^{-1}$)=3045 (m), 2997 (w), 2881 (w), 1592 (s), 1555 (s), 1476 (s), 1428 (s), 1211 (m) 1147 (s), 914 (m) 871 (m), 776 (vs), 739 (vs), 718 (vs). Melting point: 110° C.; Elemental analysis: calc.: C: 87.01% H: 5.74% N: 7.25%; C$_{14}$H$_{11}$N found: C: 86.86% H: 5.95% N: 7.29%.

EXAMPLE 5

5-Lithio-2-methylfuran (5)

8.00 g (97.4 mmol) of 2-methylfuran and 70 ml of diethyl ether are placed in a Schlenk flask at 0° C. and 60.9 ml (97.4 mmol) of a 1.60 molar solution of n-butyllithium in n-hexane are slowly added dropwise. The previously yellow solution initially becomes orange but this disappears after a short time. After five hours, the reaction solution which has been warmed to room temperature has a brownish color. The solvent is removed in an oil pump vacuum. The $^1$H-NMR and $^{13}$C-NMR spectra of the compound are recorded without further purification and the compound is used for the further reaction to form 3-(5'-methyl-2'-furyl)indene.

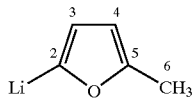

1H-NMR (d$_6$-benzene/d$_8$-tetrahydrofuran, (10:1), 200.13 MHz): δ (ppm)=6.72 (s, 1H, 4-H), 6.07 (s, 1H, 3-H), 2.36 (s, 3H, 6-H). 13-NMR (d$_6$-benzene/d$_{8\text{-}tetrahydrofuran}$, (10:1), 50.3 MHz): δ (ppm)=154.5 (C, C-5), 125.7 (CH, C-4), 121.2 (C, C-2), 105.1 (CH, C-3), 13.9 (CH$_3$, C-6).

EXAMPLE 6

3-(5'-Methyl-2'-furyl)indene (6)

12.9 g (97.6 mmol) of 1-indanone dissolved in 100 ml of diethyl ether are slowly added dropwise at 60° C. to a solution of 8.60 g (97.6 mmol) of 5-lithio-2-methylfuran (5) in 100 ml of diethyl ether. The resulting deep yellow reaction mixture is stirred at a temperature in the range from –60° C. to –40° C. for two hours. The temperature is raised to –25° C. over a further 30 minutes and the mixture is hydrolyzed using 75 ml of 2 molar hydrochloric acid. After separation of the phases, the aqueous phase is extracted three times with 70 ml of diethyl ether and the combined organic phases are dried over magnesium sulfate. The organic phases are evaporated on a rotary evaporator until an orange-brown oil is obtained. The crude product is purified by column chromatography on silica gel using isohexane/diethyl ether 4:1 as eluant, with 5% of triethylamine being additionally mixed into the eluant. This gives 15.0 g (76.4 mmol, 79%) of a yellow oil which has to be stored at –20° C. under argon since otherwise the product decomposes slowly.

R$_f$ in isohexane/diethyl ether 1:1:0.63; 1H-NMR (d$_1$-chloroform, 200.13 MHz): δ (ppm)=7.78 (d, 1H, 4-H, 3J=7.8 Hz), 7.49 (dd, 1H, 7-H, 3J=7.2 Hz, 4J=0.7 Hz), 7.35 (ddd, 1H, 5-H, 3J=7.8 Hz, 3J=7.4 Hz, 4J=0.7 Hz), 7.24 (ddd, 1H, 6-H, 3J=7.4 Hz, 3J=7.2 Hz, 4J=1.7 Hz), 6.75 (t, 1H, 2-H, 3J=2.4 Hz), 6.62 (d, 1H, 3'-H, 3J=3.2 Hz), 6.08 (dq, 1H, 4'-H, 3J=3.2 Hz, 4J=1.0 Hz), 3.51 (d, 2H, 1-H, 3J=2.4 Hz), 2.39 (dd, 3H, 6'-H, 4J=1.0 Hz, 5J=0.4 Hz). 13-CNMR (d$_1$-chloroform, 50.3 MHz): δ (ppm)=151.6 (C, C-2'), 148.9 (C, C-51), 144.5 (C, C-9), 141.8 (C, C-8), 134.3 (C, C-3), 127.5, 126.2 (each CH, C-4, C-7), 124.9, 123.9 (each CH, C-5, C-6), 120.8 (CH, C-2), 107.6, (CH, C$_3$'), 107.2 (CH, C-4'), 38.1 (CH$_2$, C-1), 13.7 (CH3, C-6'). IR (KBr): ν (cm$^{-1}$)=3067 (m), 3031 (m), 2925 (s), 2890 (m), 2878 (m), 1725 (vs), 1664(s), 1603 (m), 1460 (s), 1392 (s), 1380 (w), 1223 (s), 1221 (vs), 1090 (vs), 975 (s), 920(m),913 (m). GC-MS (30 eV) m/e=196 (100) [M$^+$], 181 (12) [M$^+$—CH$_3$], 165 (12) [M$^+$—CH$_3$O], 153 (73) [M$^+$—C$_2$H$_3$O], 115 (10) [M$^+$—C$_5$H$_5$O], 89 (7) [M$^+$—C$_7$H$_7$O].

Preparation of the Indenyllithium Compounds

General Procedure 18.8 ml (30.0 mmol) of a 1.60 molar solution of n-butyllithium in n-hexane are added dropwise at 0° C. to a solution of 30.0 mmol of the appropriately substituted indene in 150 ml of diethyl ether. The mixture is stirred for one hour at this temperature and for a further hour at room temperature. The solvent is removed in an oil pump vacuum and the residue is suspended overnight in 100 ml of pentane. The suspension is filtered through a frit and the residue is washed with a little pentane. The product is dried in an oil pump vacuum.

EXAMPLE 7

1-(2'-Pyridyl)indenyllithium (7)

Deprotonation of 2.00 g (10.3 mmol) of 3-(2'-pyridyl) indene (2) using 6.45 ml (10.3 mmol) of a 1.6 molar solution of n-butyllithium in n-hexane gives, after work-up, 1.5 g (7.54 mmol, 73%) of 1-(2'-pyridyl)indenyllithium as a deep red powder.

1H-NMR (d$_6$-benzene/d$_8$-tetrahydrofuran, (10:1), 599.9 MHz): δ (ppm)=8.11 (d, 1H, 7-H, 3J=7.2 Hz), 7.86 (d, 1H, 6'-H, 3J=4.2 Hz), 7.82 (dd, 1H, 4-H, 3J=6.6 Hz, 4J=1.2 Hz), 7.55 (d, 1H, 3'-H, 3J=8.4 Hz), 7.26 (d, 1H, 2-H, 3J=4.2 Hz), 7.16 (ddd, 1H, 4'-H, 3J=8.4 Hz, 3J=7.2 Hz, 4J=1.2 Hz), 7.02 (m, 2H, 5-H, 6-H), 6.72 (d, 1H, 3-H, 3J=4.2 Hz), 6.33 (dd, 1H, 5'-H, 3J=7.2 Hz, 3J=4.2 Hz). 13-CNMR (d$_6$-benzene/de-tetrahydrofuran, (10:1), 150.8 MHz): δ (ppm)=161.2 (C, C-2'), 148.0 (CH, C-6'), 136.4 (CH, C-4'), 129.0 (C, C-8 or C-9), 127.1 (C, C-8 or C-9), 121.2 (CH, C-4), 120.3 (CH, C-3'), 120.2 (CH, C-2), 118.2 (CH, C-5 or C-6), 116.1 (CH, C-5 or C-6), 114.3 (CH, C-7), 113.3 (CH, C-5'), 108.0 (C, C-1), 103.8 (CH, C-3). 15 N-NMR (d$_6$-benzene/d$_8$-tetrahydrofuran, (10:1), 36.50 MHz): δ (ppm)=–122.5 (pyridyl N).

EXAMPLE 8

2-(2'-Pyridyl)indenyllithium (8)

Reaction of 2.00 g (10.00 mmol) of 2-(2'-pyridyl)indene (4) with 6.4 ml (10.00 mmol) of a 1.6 molar solution of n-butyllithium in n-hexane gives 2.00 g (9.90 mmol, 99%) of 2-(2'-pyridyl)indenyl-lithium as a bright yellow solid.

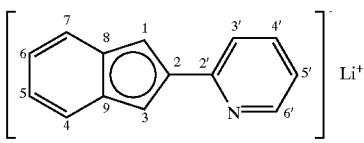

8

1H-NMR (d₆-benzene/d₈-tetrahydrofuran, (10:1), 599.9 MHz): δ (ppm)=8.13 (d, 1H, 6'-H, 3J=3.6 Hz), 7.60 (d, 1H, 3'-H, 3J=8.4 Hz), 7.46 (ddd, 1H, 4'-H, 3J=8.4 Hz, 3J=7.8 Hz, 4J=1.2 Hz), 7.23 (dd, 2H, 4-H, 7-H, 3J=5.4 Hz, 4J=2.4 Hz), 6.74 (dd, 1H, 5'-H, 3J=7.8 Hz, 3J=3.6 Hz), 6.37 (dd, 2H, 5-H, 6-H, 3J=5.4 Hz, 4J=2.4 Hz), 6.28 (s, 2H, 1-H, 3-H). 13-CNMR (d₆-benzene/d₈-tetrahydrofuran, (10:1), 150.8 MHz): δ (ppm)=162.3 (C, C-2'), 148.4 (CH, C-6'), 135.6 (CH, C-4'), 132.7 (2 C, C-8, C-9), 130.2 (C, C-2), 120.5 (CH, C-3'), 119.2 (2CH, C-4, C-7), 116.8 (CH, C-5'), 113.5 (2CH, C-5, C-6), 92.2 (2CH, C-1, C-3). 15N-NMR (d₄-benzene/d₈-tetrahydrofuran, (10:1), 36.50 MHz): δ (ppm)=−102.6 (pyridyl N).

EXAMPLE 9

1-(5'-Methyl-2'-furyl)indenyllithium (9)

Reaction of 7.22 g (36.0 mmol) of 3-(5'-methyl-2'-furyl)indene (6) with 23 ml of 1.60 molar n-butyllithium solution in n-hexane gives 9.31 g of a pale beige solid. The ¹H-NMR spectrum shows that the compound still contains one equivalent of diethyl ether and the yield is thus 33 mmol or 93.6%.

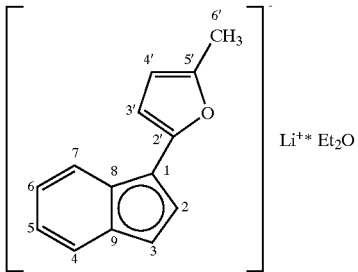

9

1H-NMR (d₆-benzene/d₈-tetrahydrofuran, (10:1), 599.9 MHz): δ (ppm) 8.16 (ddd, 1H, 7-H, 3J=7.8 Hz, 4J=1.2 Hz, 5J=0.6 Hz),7.69 (ddd, 1H, 4-H, 3J=7.8 Hz, 4J=1.2 Hz, 5J=0.6 Hz), 7.24 (d, 1H, 2-H, 3J=3.6 Hz), 7.06 (ddd, 1H, 6-H, 3J=7.8 Hz, 3J=6.6 Hz, 4J=1.2 Hz), 6.97 (ddd, 1H, 5-H, 3J=7.8 Hz, 3J=6.6 Hz, 4J=1.2 Hz), 6.27 (dd, 1H, 3-H, 3J=3.6 Hz, 5J=0.6 Hz), 6.22 (d, 1H, 3'-H, 3J=3.0 Hz), 6.05 (dq, 1H, 4'-H, 3J=3.0 Hz, 4J=1.2 Hz), 3.25 (q, 4H, (CH₃CH₂)₂O, 3J=6.6 Hz), 2.27 (d, 3H, 6'-H, 4J=1.2 Hz), 1.07 (t, 6H, (CH₃CH₂)₂O, 3J=6.6 Hz). 13-CNMR (d₆-benzene/d₈-tetrahydrofuran, (10:1), 150.8 MHz): δ (ppm)=157.2 (C, C-2'), 144.6 (C, C-5'), 130.9 (C, C-9), 126.1 (C, C-8), 120.1 (CH, C-4), 119.6 (CH, C-7), 116.2 (CH, C-6), 115.4 (CH, C-5), 114.3 (CH, C-2), 107.4 (CH, C-4'), 100.4 (C, C-1), 96.6 (CH, C-3'), 93.1 (CH, C-3), 65.9 (CH₂, (CH₃CH₂)₂O), 15.5 (CH₃, (CH₃CH₂)₂O), 13.9 (CH₃, C-6').

Preparation of the Metallocenes

EXAMPLE 10

Dichlorobis(1-(5'-Methyl-2'-furyl)indenyl)zirconium (10)

1.26 g (5.40 mmol) of zirconium tetrachloride are added at −78° C. to a suspension of 3.00 g (10.8 mmol) of 1-(5'-methyl-2'-furyl)-indenyllithium (9) in 100 ml of toluene. The reaction mixture is allowed to warm to room temperature overnight and the lithium chloride formed is filtered off through shell marl. The filtration residue is washed three times with 10 ml each time of toluene and the filtrate is evaporated in an oil pump vacuum until about 40 ml of solution remain. This solution is subsequently placed in a freezer at −20° C. overnight to allow it to crystallize. The orange solid which precipitates is filtered off and washed with 20 ml of toluene. The diastereomer ratio obtained is determined by recording the ¹H-NMR spectrum. The total yield of the 1:1 isomer mixture is 2.00 g (3.60 mmol, 67%).

Recrystallizing 0.80 g (1.77 mmol) of crude product twice from toluene gives 0.23 g (0.41 mmol) of one isomer in pure form. The orange solid which precipitates is filtered off, washed with 20 ml of toluene and then 20 ml of pentane and the product is dried under reduced pressure.

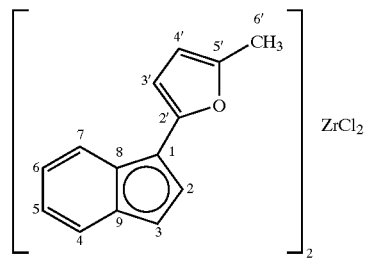

10

1H-NMR (d₂-dichloromethane, 599.9 MHz, isomer A): δ (ppm)=8.03 (dd, 1H, 7-H, 3J=8.4 Hz, 5J=0.6 Hz), 7.43 (ddd, 1H, 4-H, 3J=8.4 Hz, 4J=1.2 Hz, 5J=0.6 Hz), 7.37 (ddd, 1H, 6-H, 3J=8.4 Hz, 3J=6.6 Hz, 4J=1.2 Hz), 7.23 (ddd, 1H, 5-H, 3J=8.4 Hz, 3J=6.6 Hz, 4J=1.2 Hz), 6.76 (d, 1H, 2-H, 3J=3.0 Hz), 6.45 (d, 1H, 31-H, 3J=3.6 Hz), 6.14 (dq, 1H, 4'-H, 3J=3.6 Hz, 4J=1.2 Hz), 5.82 (dd, 1H, 3-H, 3J=3.0 Hz, 5J=0.6 Hz), 2.45 (d, 3H, 6'-H, 4J=1.2 Hz).

The isomerically pure compound could be obtained by fractional crystallization from toluene.

13-CNMR (d₂-dichloromethane, 150.8 MHz): δ (ppm)= 152.4 (C, C-5'), 147.7 (C, C-2'), 127.5 (C, C-9), 127.4 (CH, C-6), 126.6 (CH, C-5), 126.4 (CH, C-4), 125.1 (CH, C-7), 124.1 (C, C-8), 116.2 (CH, C-2), 111.0 (C, C-1), 108.5 (CH, C-31), 108.0 (CH, C-4'), 103.5 (CH, C-3), 13.9 (CH₃, C-6'). 1H-NMR (d2-dichloromethane, 599.9 MHz, isomer B): δ (ppm)=8.01 (dd, 1H, 7-H, 3J=8.4 Hz, 5J=0.6 Hz), 7.48 (ddd, 1H, 4-H, 3J=8.4 Hz, 4J=1.2 Hz, 5J=0.6 Hz), 7.35 (ddd, 1H, 6-H, 3J=8.4 Hz, 3J=6.6 Hz, 4J=1.2 Hz), 7.25 (ddd, 1H, 5-H, 3J=8.4 Hz, 3J=6.6 Hz, 4J=1.2 Hz), 6.51 (d, 1H, 2-H, 3J=3.0 Hz), 6.50 (d, 1H, 3'-H, 3J=3.0 Hz), 6.14 (dq, 1H, 4'-H, 3J=3.0 Hz, 4J=1.2 Hz), 6.08 (dd, 1H, 3-H, 3J=3.0 Hz, 5J=0.6 Hz), 2.46 (d, 3H, 6'-H, 4J=1.2 Hz).

The isomer ratio is 60:40 13-CNMR (d₂-dichloromethane, 150.8 MHz): δ (ppm)=152.5 (C, C-5'), 147.8 (C, C-2'), 127.1 (CH, C-6), 126.8 (C, C-9), 126.5 (CH, C-5), 126.1 (CH, C-4), 125.1 (CH, C-7), 124.0 (C, C-8), 116.6 (CH, C-2), 111.8 (C, C-1), 108.6 (CH, C-3'), 107.9 (CH, C-4'), 102.2 (CH, C-3), 13.8 (CH₃, C-6'). IR (KBr): ν (cm⁻¹)=3102 (s), 2919 (w), 1821 (w), 1705 (w), 1630 (m), 1567 (s), 1439 (s), 1382 (s), 1029 (s), 809 (vs), 748 (vs). Melting point: 246.3° C.; Elemental analysis: calc.: C: 60.86% H: 4.01%; C₂₈H₂₂Cl₂O₂Zr found: C: 59.20% H: 4.01%.

The elemental analysis, IR analysis and the melting point were determined on the isolated isomer A of compound 10.

EXAMPLE 11

Dichlorobis(1-(2'-Pyridyl)indenyl)zirconium (11)

1.76 g (5.40 mmol) of zirconium tetrachloride are added at −78° C. to a suspension of 3.00 g (15.1 mmol) of 1-(2'-pyridyl)indenyllithium (7) in 100 ml of toluene. The reaction mixture is allowed to warm to room temperature overnight and the lithium chloride formed is filtered off through shell marl. The filtration residue is washed three times with 10 ml each time of toluene and the filtrate is evaporated in an oil pump vacuum until about 40 ml of solution remain. This solution is subsequently placed in a freezer at −20° C. overnight to allow it to crystallize. The orange solid which precipitates is filtered off and washed with 20 ml of toluene. The diastereomer ratio obtained is determined by recording a $^1$H-NMR spectrum. The total yield of the 1:1 isomer mixture is 1.80 g (3.20 mmol, 43%). The two isomers are not separated from one another.

1H-NMR ($d_6$-benzene/$d_8$-tetrahydrofuran, (10:1), 599.9 MHz): δ (ppm)=8.01 (d, 1H, 7-H, $^3$J=7.4 Hz), 7.76 (d, 1H, 6'-H, $^3$J=4.3 Hz), 7.62 (dd, 1H, 4-H, $^3$J 6.6 Hz, $^4$J=1.2 Hz), 7.35 (d, 1H, 3'-H, $^3$J=8.4 Hz), 7.06 (d, 1H, 2-H, $^3$J=4.3 Hz), 6.88 (ddd, 1H, 4'-H, $^3$J=8.4 Hz, $^3$J=7.4 Hz, $^4$J=1.2 Hz), 6.80 (m, 2H, 5-H, 6-H), 6.72 (d, 1H, 3-H, $^3$J=4.3 Hz), 6.03 (dd, 1H, 5'-H, $^3$J 7.4 Hz, $^3$J=4.3 Hz). 13C-NMR ($d_6$-benzene/$d_8$-tetrahydrofuran, (10:1), 150.8 MHz): δ (ppm)=160.2 (C, C-2'), 138.0 (CH, C-6'), 126.4 (CH, C-4'), 121.0 (C, C-8 or C-9), 125.1 (C, C-8 or C-9), 120.2 (CH, C-4), 119.3 (CH, C-3'), 118.2 (CH, C-2), 116.2 (CH, C-5 or C-6), 114.1 (CH, C-5 or C-6), 112.3 (CH, C-7), 111.3 (CH, C-5'), 107.0 (C, C-1), 101.8 (CH, C-3). 15N-NMR ($d_6$-benzene/$d_8$-tetrahydrofuran, (10:1), 36.50 MHz): δ (ppm)=−123.5 (pyridyl N). IR (KBr): ν (cm$^{-1}$)=3101 (s), 2915 (w), 1819 (w), 1701 (w), 1610 (m), 1547 (s), 1419 (s), 1362 (s), 1019 (s), 819 (vs), 758 (vs). Melting point: 226.3° C.

The IR analysis and the melting point were determined on the isolated isomer A of compound 11.

EXAMPLE 12

Dichlorobis(2-(2'-Pyridyl)indenyl)zirconium (12)

1.61 g (4.95 mmol) of zirconium tetrachloride are added at −78° C. to a suspension of 2.0 g (9.9 mmol) of 2-(2'-pyridyl)indenyllithium (8) in 100 ml of toluene. The reaction mixture is allowed to warm to room temperature overnight and the lithium chloride formed is filtered off through shell marl. The filtration residue is washed three times with 10 ml each time of toluene and the filtrate is evaporated in an oil pump vacuum until about 45 ml of solution remain. This solution is subsequently placed in a freezer at −20° C. overnight to allow it to crystallize. The orange solid which precipitates is filtered off and washed with 30 ml of toluene. The diastereomer ratio obtained is determined by recording a $^1$H-NMR spectrum. The total yield of the 1:1 isomer mixture is 2.40 g (3.7 mmol, 81%). The two isomers are not separated from one another.

1H-NMR ($d_6$-benzene/$d_8$-tetrahydrofuran, (10:1), 599.9 MHz): δ (ppm)=8.33 (d, 1H, 6'-H, 3J=3.8 Hz), 7.80 (d, 1H, 3'-H, 3J=8.5 Hz), 7.56 (ddd, 1H, 4'-H, 3J=8.5 Hz, 3J=7.8 Hz, 4J=1.2 Hz), 7.03 (dd, 2H, 4-H, 7-H, 3J=5.4 Hz, 4J=2.4 Hz), 6.84 (dd, 1H, 5'-H, 3J=7.8 Hz, 3J=3.8 Hz), 6.57 (dd, 2H, 5-H, 6-H, 3J=5.4 Hz, 4J=2.4 Hz), 6.48 (s, 2H, 1-H, 3-H). 13-CNMR ($d_6$-benzene/$d_8$-tetrahydrofuran, (10:1), 150.8 MHz): δ (ppm)=165.3 (C, C-2'), 147.4 (CH, C-6'), 131.6 (CH, C-4'), 130.7 (2C, C-8, C-9), 129.2 (C, C-2), 121.5 (CH, C-3'), 117.2 (2CH, C-4, C-7), 114.8 (CH, C-5'), 112.5 (2CH, C-5, C-6), 90.2 (2CH, C-1, C-3). 15N-NMR ($d_6$-benzene/$d_8$-tetrahydrofuran, (10:1), 36.50 MHz): δ (ppm)=−102.6 (pyridyl N). Melting point: 206.3° C.

EXAMPLE 13

2-(5'-Methyl-2'-furyl)indene (13)

8.00 g (60.4 mmol) of 2-indanone dissolved in 100 ml of diethyl ether are slowly added dropwise at −60° C. to a solution of 5.29 g (60.4 mmol) of 5-lithio-2-methylfuran (5) in 100 ml of diethyl ether. The resulting dark yellow reaction mixture is stirred at a temperature in the range from −60° C. to −40° C. for six hours. The solution is allowed to warm to −25° C. over a further 30 minutes and is hydrolyzed using 75 ml of 2 molar hydrochloric acid. After separation of the phases, the aqueous phase is extracted three times with 70 ml of diethyl ether and the combined organic phases are dried over magnesium sulfate. The organic phases are evaporated on a rotary evaporator until a brown oil is obtained. The crude product is purified by column chromatography on silica gel using isohexane/diethyl ether 4:1 as eluant. This gives 6.90 g (35.2 mmol, 58%) of a white solid which is stored at 4° C.

$R_f$ in isohexane/diethyl ether 1:1:0.61; 1H-NMR ($d_6$-benzene, 200.13 MHZ): δ (ppm)=7.21–7.04 (m, 5H, 3-H, 4-H, 5-H, 6-H, 7-H), 6.14 (d, 1H, 3'-H, 3J=3.2 Hz), 5.83 (dq, 1H, 4'-H, 3J=3.2 Hz, 4J=0.9 Hz), 3.36 (s, 2H, 1-H), 2.34 (d, 3H, 6'-H, 4J=0.9 Hz). 1H-NMR ($d_1$-chloroform, 200.13 MHz): δ (ppm)=7.39 (d, 1H, 4-H, 3J=7.2 Hz), 7.33 (d, 1H, 7-H, 3J=7.4 Hz), 7.25 (dd, 1H, 5-H, 3J=7.2 Hz, 3J=8.4 Hz), 7.12 (dd, 1H, 6-H, 3J=7.4 Hz, 3J=8.4 Hz), 6.98 (s, 1H, 3-H), 6.33 (d, 1H, 3'-H, 3J=3.2 Hz), 6.01 (dq, 1H, 4'-H, 3J=3.2 Hz, 4J=0.4 Hz), 3.67 (s, 2H, 1-H), 2.34 (d, 3-H, 6'-H, 4J=0.4 Hz). Melting point: 61° C.; Elemental analysis: calc.: C: 85.68% H: 6.18%; $C_{14}H_{12}O$ found: C: 85.49% H: 5.98%.

EXAMPLE 14

5-Lithio-2-methylthiophene (14)

2.97 g (30.3 mmol) of 2-methylthiophene and 70 ml of diethyl ether are placed in a Schlenk flask at room temperature, and 18.8 ml (30.3 mmol) of a 1.60 molar solution of n-butyllithium in n-hexane are slowly added dropwise. After twelve hours, the reaction solution has a brownish color. The solvent is removed in an oil pump vacuum. The $^1$H-NMR spectrum of the compound is recorded without further purification and the compound is used for the further reaction to form 2-(5'-methyl-2'-thienyl)indene.

1H-NMR ($d_6$-benzene/$d_8$-tetrahydrofuran, (10:1), 200.13 MHz): δ (ppm)=7.48 (d, 1H, 3-H, 3J=2.6 Hz), 7.17 (m, 1H, 4-H), 2.71 (s, 3H, 6-H).

EXAMPLE 15

2-(5'-Methyl-2'-thienyl)indene (15)

4.00 g (30.3 mmol) of 2-indanone dissolved in 100 ml of diethyl ether are slowly added dropwise at −60° C. to a solution of 3.15 g (30.3 mmol) of 5-lithio-2-methylfuran (5) in 100 ml of diethyl ether. The resulting dark yellow reaction mixture is stirred at a temperature in the range from −60° C. to −40° C. for six hours. The solution is allowed to warm to −25° C. over a further 30 minutes and is hydrolyzed using 75 ml of 2 molar hydrochloric acid. After separation of the phases, the aqueous phase is extracted three times with 70 ml of diethyl ether and the combined organic phases are dried over magnesium sulfate. The organic phases are evaporated on a rotary evaporator and the product is allowed to crystallize at 4° C. Drying in an oil pump vacuum gives 2.94 g (13.8 mmol, 46%) of a yellowish white solid.

1H-NMR ($d_6$-benzene, 200.13 MHz): δ (ppm)=7.22–7.02 (m, 4H, 4-H, 5-H, 6-H, 7-H), 6.84 (s, 1H, 3-H), 6.72 (d, 1 R, 3'-H, 3J=3.6 Hz), 6.44 (dq,1H, 4'-H, 3J=3.6 Hz, 4J=1.2 Hz), 3.37 (s, 2H, 1-H), 2.13 (d, 3H, 6'-H, 4J=1.2 Hz). Melting point: 154° C.; Elemental analysis: calc.: C: 79.20% H: 5.70%; $C_{14}H_{12}S$ found: C: 79.20% H: 5.81%.

EXAMPLE 16

2-(4'-Oxopentanoyl)indene (16)

4.00 g (20.4 mmol) of 2-(5'-methyl-2'-furyl)indene (13) are dissolved in 40 ml of glacial acetic acid, the solution is admixed with 20 ml of $H_2O$ and 1.6 ml of 20% strength $H_2SO_4$ and refluxed for five hours at a bath temperature of 120° C. The cooled solution is poured into ice water and the solid which precipitates is filtered off with suction. The product is dissolved in diethyl ether/ethyl acetate (diethyl ether added first, followed by ethyl acetate), dried over magnesium sulfate and then crystallized from the filtrate at −20° C. Dryng in an oil pump vacuum gives 2.80 g (13.1 mmol, 64%) of a beige solid in the form of platelets. 1H-NMR ($d_6$-benzene, 200.13 MHz): δ (ppm)=7.25–7.06 (m, 5H, 3-H, 4-H, 5-H, 6-H, 7-H), 3.43 (d, 2H, 1-H, J=1.8 Hz), 2.76 (t, 2H, 2'-H, 3J=6.6 Hz), 2.40 (t, 2H, 3'-H, 3J=6.6 Hz), 1.76 (s, 3H, 5'-H). Melting point: 85° C.; Elemental analysis: calc.: C: 78.48% H: 6.59%; $C_{14}H_{14}O_2$ found: C: 78.41% H: 6.81%.

EXAMPLE 17

2-(5'-Methyl-2'-N-methylpyrrolyl)indene (17)

2.2 g (10.3 mmol) of 2-(4'-oxopentanoyl)indene (16) are dissolved in 40 ml of ethanol, and a two-fold excess of 1.77 ml (20.6 mmol, 40% strength solution in water, d=0.899 g/ml) of methylamine is added. The reaction solution is refluxed for 14 hours. After cooling, the solid which has precipitated is dissolved by addition of diethyl ether and the solution is dried over magnesium sulfate. After evaporation of the solvent on a rotary evaporator, the product precipitates in a freezer at −20° C. Drying in an oil pump vacuum gives 1.00 g (4.77 mmol, 47%) of a brown solid.

1H-NMR ($d_6$-benzene, 200.13 MHz): δ (ppm)=7.34–7.05 (m, 4H, 4-H, 5-H, 6-H, 7-H), 6.56 (s, 1H, 3-H), 6.36 (d, 1H, 3'-H, 3J=3.6 Hz), 6.03 (dq, 1H, 4'-H, 3J=3.6 Hz, 4J=0.8 Hz), 3.60 (s, 2-H, 1-H), 2.99 (s, 3H, N-$CH_3$), 1.88 (d, 3H, 6'-H, 4J=0.8 Hz). Melting point: 120° C.; Elemental analysis: calc.: C: 86.08% H: 7.22% N: 6.69%; $C_{15}H_{15}N$ found: C: 85.52% H: 7.37% N. 6.20%.

Preparation of the Indenyllithium Compounds

General procedure for the synthesis of the furyl- and thienyl-substituted indenes:

18.8 ml (30.0 mmol) of a 1.60 molar solution of n-butyllithium in n-hexane are added dropwise at room temperature to a solution of 30.0 mmol of the appropriately substituted indene in 150 ml of diethyl ether. The mixture is stirred at this temperature for two hours. The solvent is removed in an oil pump vacuum and the residue is suspended overnight in 100 ml of pentane. The suspension is filtered through a frit and the residue is washed with a little pentane. The product is dried in an oil pump vacuum.

EXAMPLE 18

2-(5'-Methyl-2'-furyl)indenyllithium (18)

Deprotonation of 2.50 g (12.7 mmol) of 2-(5'-methyl-2'-furyl)indene (13) using 7.96 ml (12.7 mmol) of a 1.6 molar solution of n-butyllithium in n-hexane gives, after work-up, 2.32 g (11.5 mmol, 90%) of 2-(5'-methyl-2'-furyl) indenyllithium as a beige solid.

1H-NMR ($d_6$-benzene/$d_8$-tetrahydrofuran, (10:1), 200.13 MHz): δ (ppm)=7.68 (m, 2H, 4-H, 7-H), 6.91 (m, 2H, 5-H, 6-H), 6.63 (s, 2H, 1-H, 3-H), 6.34 (d, 1H, 3'-H, 3J=3.0 Hz), 5.95 (dq, 1H, 4'-H, 3J=3.0 Hz, 4J=1.0 Hz), 2.19 (d, 3H, 6'-H, 4J=1.0 Hz). 13-CNMR ($d_6$-benzene/$d_8$-tetrahydrofuran, (10:1), 50.3 MHz): δ (ppm)=156.5 (C, C-2'), 147.6 (C, C-51), 129.8 (2C, C-8, C-9), 122.4 (C, C-2), 119.9 (2CH, C-4, C-7), 115.4 (2CH, C-5, C-6), 107.4 (CH, C-4'), 101.2 (CH, C-3'), 89.0 (2CH, C-1, C-3), 13.7 ($CH_3$, C-6').

EXAMPLE 19

2-(5'-Methyl-2'-thienyl)indenyllithium (19)

Reaction of 2.84 g (13.4 mmol) of 2-(5'-methyl-2'-thienyl)-indene (15) with 8.36 ml (13.4 mmol) of a 1.6 molar solution of n-butyllithium in n-hexane gives 2.78 g (12.7 mmol, 95%) of 2-(5'-methyl-2'-thienyl)indenyllithium as a brownish solid.

1H-NMR ($d_6$-benzene/$d_8$-tetrahydrofuran, (10:1), 200.13 MHz): δ (ppm)=7.64 (m, 2H, 4-H, 7-H), 7.04 (d, 1H, 3'-H, $^3J$=3.2 Hz), 6.91 (m, 2H, 5-H, 6-H), 6.57 (dq, 1H, 4'-H, $^3J$=3.2 Hz, $^4J$=1.2 Hz), 6.55 (s, 2H, 1-H, 3-H), 2.28 (d, 3H, 6'-H, $^4J$=1.2 Hz).

EXAMPLE 20

2-(5'-Methyl-2'-N-methylpyrrolyl)indenyllithium (20)

0.50 g (2.89 mmol) of 2-(5'-methyl-2'-N-methylpyrrolyl) indene (17) is dissolved in diethyl ether, after which 1.19 ml (2.89 mmol) of a 2.0 molar solution of methyllithium in diethyl ether are slowly added dropwise. After a reaction time of four hours, the solvent is removed in an oil pump vacuum and the product is examined by $^1$H-NMR spectroscopy without further purification.

1H-NMR ($d_6$-benzene/$d_8$-tetrahydrofuran, (10:1), 200.13 MHz): δ (ppm)=7.61 (m, 2H, 4-H, 7-H), 6.84 (m, 2H, 5-H, 6-H), 6.32 (s, 2H, 1-H, 3-H), 6.22 (d, 1H, 3'-H, 3J=3.4 Hz), 5.98 (d, 1H, 4'-H, 3J=3.4 Hz), 3.50 (s, 3H, N-$CH_3$), 2.10 (s, 3H, 6'-H).

Preparation of the Dichlorozirconocene Complexes

General Procedure 1.17 g (5.00 mmol) of zirconium tetrachloride are added at −78° C. to a suspension of 10.0 mmol of the indenyllithium compounds in 100 ml of toluene. The reaction mixture is allowed to warm to room temperature overnight and the lithium chloride obtained is filtered off through shell marl. The filtration residue is washed three times with 10 ml each time of toluene and the filtrate is evaporated in an oil pump vacuum until about 40 ml of solution remain. This solution is subsequently placed in a freezer at −20° C. overnight to allow the product to crystallize out. The solid which has precipitated is filtered off and washed with 10 ml of toluene. Drying in an oil pump vacuum gives the corresponding metallocenes.

EXAMPLE 21

Dichlorobis(2-(5'-Methyl-2'-furyl)indenyl)zirconium (21)

0.50 g (2.47 mmol) of 2-(5'-methyl-2'-furyl)indenyllithium (16) is suspended in 80 ml of toluene and, at −78° C., 0.29 g (1.24 mmol) of zirconium tetrachloride is added. After work-up, 0.35 g (0.63 mmol, 51%) of a yellow powder is obtained.

1H-NMR ($d_2$-dichloromethane, 599.9 MHz): δ (ppm)= 7.30 (m, 4H, 4-H, 7-H), 7.12 (m, 4H, 5-H, 6-H), 6.55 (s, 4H, 1-H, 3-H), 6.47 (d, 2H, 3'-H, 3J=3.6 Hz), 6.16 (dq, 2H, 4'-H, 3J=3.6 Hz, 4J=0.6 Hz), 2.48 (d, 6H, 6'-H, 4J=0.6 Hz). 13-CNMR ($d_2$-dichloromethane, 150.1 MHz): δ (ppm)= 153.6 (2C, C-2'), 147.3 (2C, C-2), 126.7 (4C, C-8, C-9), 126.6 (4CH, C-4, C-7), 125.4 (2C, C-5'), 124.9 (4CH, C-5, C-6), 110.6 (2CH, C-3'), 108.6 (2CH, C-4'), 100.6 (4CH, C-1, C-3), 13.9 ($2CH_3$, C-6'). Melting point: 190° C.; Elemental analysis: calc.: C: 60.86% H: 4.01%; $C_{28}H_{22}Cl_2O_2Zr$ found: C: 60.72% H: 4.12%.

EXAMPLE 22

Dichlorobis(2-(5'-Methyl-2'-thienyl)indenyl)zirconium (22)

Reaction of 2.00 g (9.16 mmol) of 2-(5'-methyl-2'-thienyl)indenyllithium (17) with 1.07 g (4.58 mmol) of zirconium tetrachloride in 80 ml of toluene at −78° C. and subsequent work-up gives 0.90 g (1.54 mmol, 34%) of a yellow solid.

1H-NMR ($d_2$-dichloromethane, 599.9 MHz): δ (ppm) 7.26 (m, 4H, 4-H, 7-H), 7.12 (m, 4H, 5-H, 6-H), 7.00 (d, 2H, 3'-H, 3J=3.0 Hz), 6.78 (dq, 2H, 4'-H, 3J=3.0 Hz, 4J=1.2 Hz), 6.49 (s, 4H, 1-H, 3-H), 2.57 (d, 6H, 6'-H, 4J=1.2 Hz). 13-CNMR ($d_2$-dichloromethane, 150.1 MHz): δ (ppm)= 142.1 (2C, C-2'), 134.7 (2C, C-2), 129.1 (2C, C-5'), 126.7 (4CH, C-4, C-7), 126.6 (2CH, C-3'), 124.9 (4CH, C-5, C-6), 126.6 (2CH, C-3'), 102.7 (4CH, C-1, C-3), 15.6 ($2CH_3$, C-6'). Melting point: 183° C.; Elemental analysis: calc.: C: 57.51% H: 3.79%; $C_{28}H_{22}Cl_2S_2Zr$ found: C: 57.08% H: 4.07%.

EXAMPLE 23

Dichlorobis(2-(5'-Methyl-2'-N-methylpyrrolyl)-indenyl)zirconium (23)

Addition of 0.26 g (1.11 mmol) of zirconium tetrachloride to a suspension of 0.51 g (2.36 mmol) of 2-(5'-methyl-2'-N-methylpyrrolyl)indenyllithium (18) in 40 ml of toluene at −78° C. gives, after purification, 0.10 g (0.18 mmol, 16%) of a bright yellow solid.

1H-NMR ($d_2$-dichloromethane, 599.9 MHz): δ (ppm) 7.28 (m, 4H, 4-H, 7-H), 7.13 (m, 4H, 5-H, 6-H), 6.35 (d, 2H, 3'-H, 3J=3.6 Hz), 6.33 (s, 4H, 1-H, 3-H), 6.02 (d, 2H, 4'-H, 3J=3.6 Hz), 3.60 (s, 6H, N-$CH_3$), 2.33 (s, 6H, 6'-H). 13-CNMR ($d_2$-dichloromethane, 150.1 MHz): δ (ppm)= 133.6 (2C, C-2'), 129.6 (2C, C-2), 126.9 (2C, C-5'), 126.6 (4C, C-8, C-9), 126.4 (4CH, C-4, C-7), 124.9 (4CH, C-5, C-6), 110.9 (2CH, C-3'), 107.8 (2CH, C-4'), 101.8 (4CH, C-1, C-3), 33.1 ($2CH_3$, N—$CH_3$), 13.1 ($2CH_3$, C-6'). Melting point: 229° C.; Elemental analysis: calc.: C: 62.27% H: 4.88%; $C_{30}H_{28}Cl_2N_2Zr$ found: C: 60.29% H: 5.49%.

Catalytic Polymerization of Propene

Technique

The propene polymerizations using the zirconium catalysts 21 and 22 are carried out in a Büchi glass autoclave. The baked-out apparatus is charged with 200 ml of toluene and 20 ml of a 10.5 percent strength by weight solution of methylaluminoxane in toluene, and is brought to the appropriate temperature by means of a cryostat. At the desired temperature, the solution is then pressurized to 2 bar of propene and is stirred vigorously for 30 minutes. 10 mg-12 mg (18 μmol-21.7 μmol) of the catalyst in 20 ml of solvent (3 ml of methylene chloride to dissolve the compounds and 10 ml of toluene) are subsequently introduced into the glass autoclave. After a reaction time of 30 minutes, 20 ml of a 1:1 mixture of 2N hydrochloric acid and methanol are carefully added. This destroys both the catalytically active species and excess methylaluminoxane. The mixture is stirred for a further 30 minutes at room temperature with the system open in order to allow unreacted propene still dissolved in the mixture to escape. Subsequently, the reaction mixture is admixed with 30 ml of 4N hydrochloric acid in a separatory funnel to bring any insoluble aluminum oxide into solution. Before the aqueous phase can be separated off, the mixture has to be heated to 60° C. in a water bath in order to make a phase boundary clearly recognizable. After separation, the aqueous phase is washed with 100 ml of toluene. The solvent is removed on a rotary evaporator and the polymers obtained are then dried overnight in an oil pump vacuum.

Two polymerizations are carried out at each temperature in order to ensure reproducibility of the results.

The polymerization results using complex 21 are summarized in the following table:

| Temperature | 20° C. | | 0° C. | | −20° C. | |
|---|---|---|---|---|---|---|
| Polymer | PP 1 | PP 2 | PP 3 | PP 4 | PP 5 | PP 6 |
| Cat. (mg) | 10 | 10 | 12 | 12 | 12 | 12 |
| Cat. (μmol) | 18.1 | 18.1 | 21.7 | 21.7 | 21.7 | 21.7 |
| Cocat. (ml) | 20 | 20 | 20 | 20 | 20 | 20 |
| Cocat. (mmol) | 34.5 | 34.5 | 34.5 | 34.5 | 34.5 | 34.5 |
| Al/Zr[1] | 1906 | 1906 | 1589 | 1589 | 1589 | 1273 |
| Duration (h) | 0.5 | 0.5 | 0.5 | 0.5 | 0.5 | 0.5 |
| PP (g) | 18.0 | 18.5 | 23.1 | 29 | 45 | 49 |
| Activity[2] | 9.9 | 10.3 | 10.5 | 13.2 | 20.5 | 22.3 |

The polymerization results using complex 22 are summarized in the following table:

| Temperature | 20° C. | | 0° C. | | −20° C. | |
|---|---|---|---|---|---|---|
| Polymer | PP 1 | PP 2 | PP 3 | PP 4 | PP 5 | PP 6 |
| Cat. (mg) | 12 | 12 | 12 | 12 | 12 | |
| Cat. (μmol) | 20.5 | 20.5 | 20.5 | 20.5 | 20.5 | |
| Cocat. (ml) | 20 | 20 | 20 | 20 | 20 | |
| Cocat. (mmol) | 34.5 | 34.5 | 34.5 | 34.5 | 34.5 | |
| Al/Zr[1] | 1682 | 1554 | 1443 | 1443 | 1682 | |

-continued

| Temperature | 20° C. | | 0° C. | | −20° C. | |
|---|---|---|---|---|---|---|
| Polymer | PP 1 | PP 2 | PP 3 | PP 4 | PP 5 | PP 6 |
| Duration (h) | 0.5 | 0.5 | 0.5 | 0.5 | 0.5 | |
| PP (g) | 16.7 | 14.2 | 25.0 | 24.0 | 33 | |
| Activity[2] | 8.4 | 7.1 | 12.5 | 12.0 | 16.5 | |

[1]Al/Zr: mmol (AlMeO)/mmol (Zr)
[2]Activity: g (polymer)/mol (Zr).h.bar * 105

We claim:

1. A compound of the formula (II),

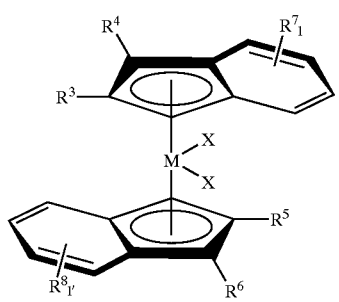

(II)

where

M is a metal of group 4 of the Periodic Table of the Elements, $R^3$, $R^4$, $R^5$ and $R^6$ are identical or different and are each hydrogen, $C_1$–$C_{18}$-alkyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, wherein at least one substituent $R^3$, $R^4$, $R^5$ or $R^6$ is a $C_4$–$C_{24}$-heteroaryl, $R^7$, $R^8$ are identical or different and are each a hydrogen atom, a halogen atom $C_1$–$C_{18}$-alkyl, $C_2$–$C_{10}$-alkenyl, $C_3$–$C_{15}$-alkylalkenyl, $C_6$–$C_{18}$-aryl which may be substituted or unsubstituted, $C_5$–$C_{18}$-heteroaryl, $C_7$–$C_{20}$-arylalkyl, $C_7$–$C_{20}$-alkylaryl, fluorinated $C_6$–$C_{18}$-aryl, fluorinated $C_1$–$C_{12}$-alkyl, fluorinated $C_7$–$C_{20}$-arylalkyl or fluorinated $C_7$–$C_{20}$-alkylaryl, and two radicals $R^7$ or $R^8$ may form a monocyclic or polycyclic ring system which may in turn be substituted or unsubstituted, X is a halogen atom, l,l are identical or different and are each an integer from zero to 4.

2. A compound as claimed in claim 1 wherein
$R^7$, $R^8$ are identical or different and are each hydrogen, halogen or $C_1$–$C_{18}$-alkyl, $C_2$–$C_{10}$-alkenyl, $C_3$–$C_{15}$-alkylalkenyl, phenyl, tolyl, xylyl, tert-butylphenyl, ethylphenyl, naphthyl, acenaphthyl, phenanthrenyl, anthracenyl, $C_5$–$C_{18}$-heteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, and two radicals $R^7$ or $R^8$ may form a monocyclic or polycyclic ring system which may in turn be substituted or unsubstituted.

3. A compound as claimed in claim 1, wherein the indenyl ring is substituted in the 2 position, 3 position, 4 position, 2,4,5 positions, 2,4,6 positions, 3,4,6 positions, 2,4,7 positions or 2,4,5,6 positions by $C_1$–$C_{20}$-groups, or where two or more substituents of the indenyl ring may together form a ring system.

4. A compound as claimed in claim 1, wherein the at least one $C_4$–$C_{24}$-heteroaryl $R^3$, $R^4$, $R^5$ or $R^6$ is

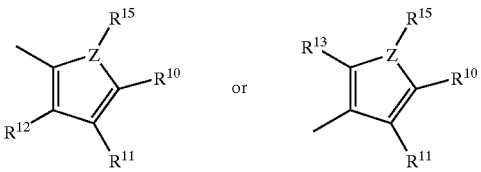

where $R^{10}$, $R^{11}$, $R^{12}$, $R^{13}$ are identical or different and are each hydrogen, $C_1$–$C_{18}$-alkyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, Z is a heteroatom from group 15 or 16, and $R^{15}$ is not present when Z is a heteroatom from group 16 and when Z is a heteroatom from group 15 is a hydrogen atom, $C_1$–$C_{18}$-alkyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylaryl, or the at least one $C_4$–$C_{24}$-heteroaryl $R^3$, $R^4$, $R^5$ or $R^6$ is

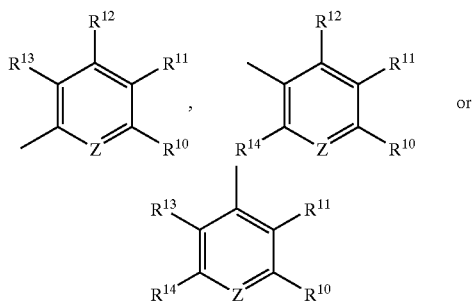

where $R^{10}$, $R^{11}$, $R^{12}$, $R^{13}$ $R^{14}$ are identical or different and are each hydrogen, $C_1$–$C_{18}$-alkyl, $C_2$–$C_{10}$-alkenyl, $C_3$–$C_{15}$-alkylalkenyl, $C_6$–$C_{18}$-aryl, $C_4$–$C_{24}$-heteroaryl, $C_4$–$C_{24}$-alkylheteroaryl, $C_7$–$C_{20}$-arylalkyl, $C_7$–$C_{20}$-alkylaryl, fluorinated $C_1$–$C_{12}$-alkyl, fluorinated $C_6$–$C_{18}$-aryl, fluorinated $C_7$–$C_{20}$-arylalkyl or fluorinated $C_7$–$C_{20}$-alkylary and Z is a heteroatom from group 15.

5. A compound as claimed in claim 4, wherein the at least one $C_4$–$C_{24}$-heteroaryl $R^3$, $R^4$, $R^5$ or $R^6$ is a group

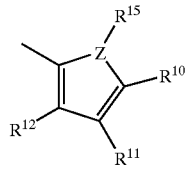

where $R^{10}$ is hydrogen, $C_1$–$C_{18}$-alkyl or phenyl, $R^{11}$, $R^{12}$ are each hydrogen and Z is oxygen, nitrogen or sulfur, $R^{15}$ is not present when Z is oxygen or sulfur, and when Z is nitrogen, $R^{15}$ is hydrogen, methyl, ethyl, n-butyl, n-hexyl, cyclohexyl or phenyl, or

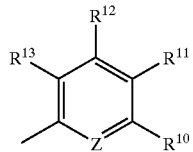

where $R^{10}$ is hydrogen, a $C_1$–$C_{18}$-alkyl group or phenyl, $R^{11}$, $R^{12}$, $R^{13}$ are each hydrogen, and Z is nitrogen.

6. A catalyst system comprising at least one metallocene of the formula II as claimed in claim 1 and at least one cocatalyst.

7. A catalyst system as claimed in claim 6 which further comprises at least one support.

* * * * *

UNITED STATES PATENT AND TRADEMARK OFFICE
CERTIFICATE OF CORRECTION

| | | |
|---|---|---|
| PATENT NO. | : 6,458,982 B1 | Page 1 of 1 |
| APPLICATION NO. | : 09/515406 | |
| DATED | : October 1, 2002 | |
| INVENTOR(S) | : Schottek et al. | |

It is certified that error appears in the above-identified patent and that said Letters Patent is hereby corrected as shown below:

Title page, item (75) Inventors: Add Gerhard Erker and Thorsten Dreier as third and fourth invemtors.

Signed and Sealed this

Thirtieth Day of January, 2007

JON W. DUDAS
*Director of the United States Patent and Trademark Office*